March 23, 1954

H. L. LESIGNE 2,673,234

AUTOMATIC SWITCHING SYSTEM APPLICABLE TO TELEGRAPHY

Original Filed March 16, 1946

INVENTOR
HENRI LOUIS LESIGNE
BY
Adams+Bush
ATTORNEYS

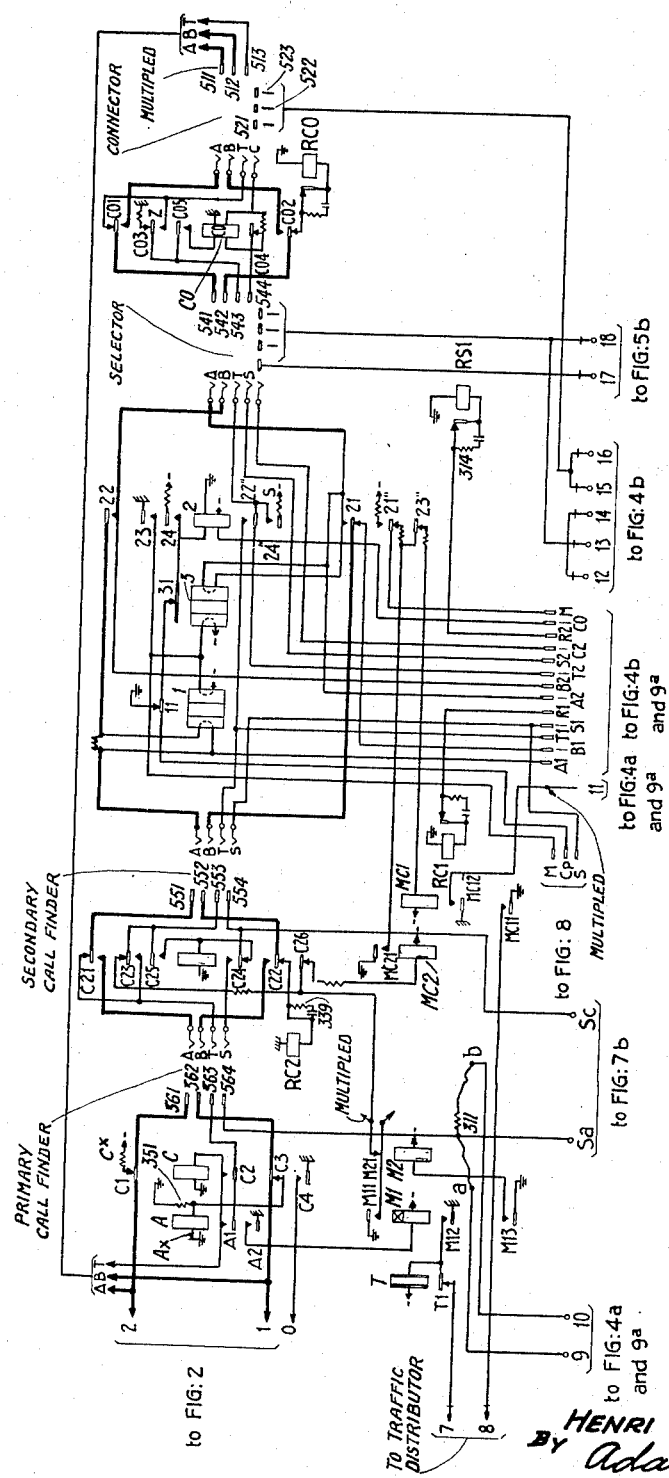

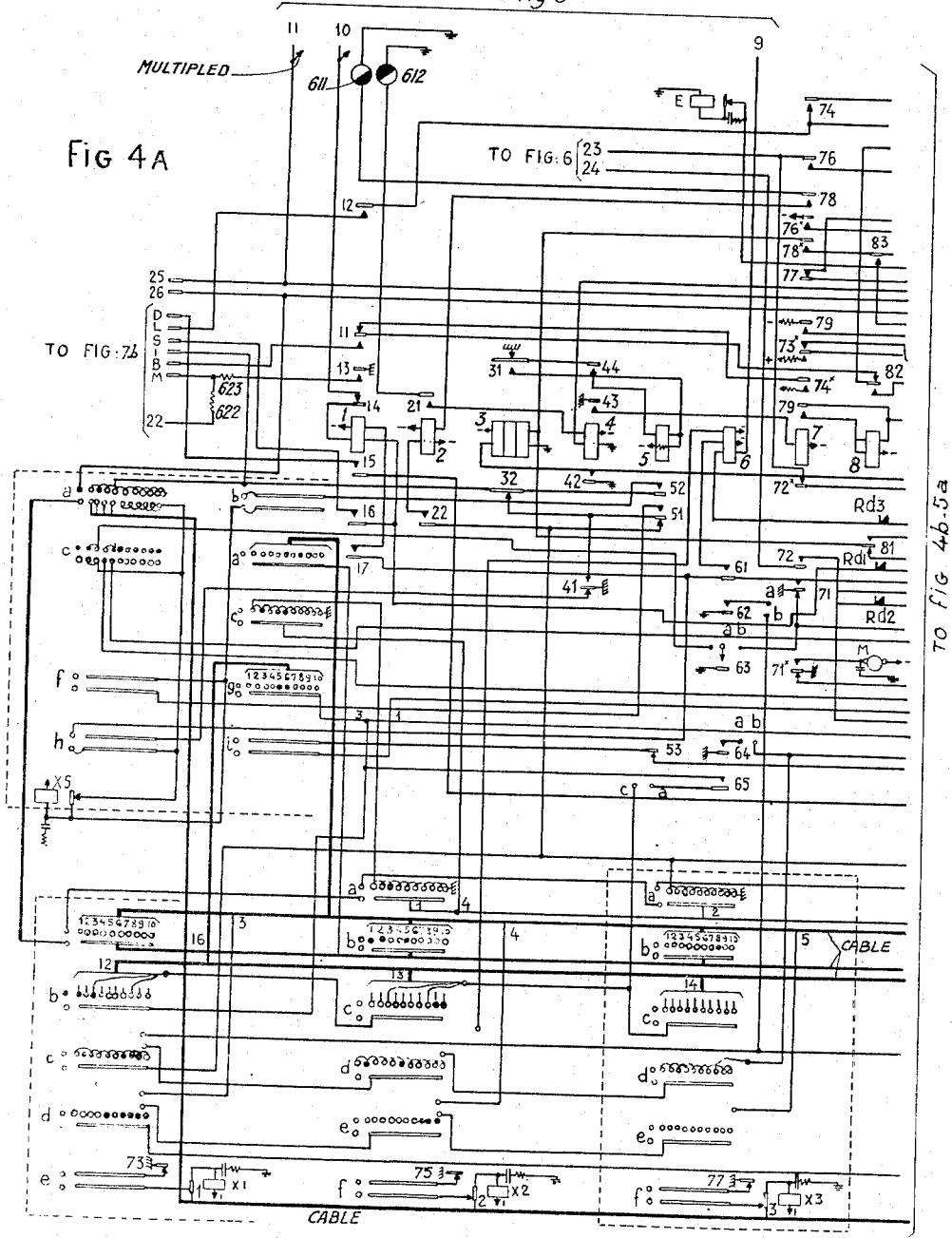

Fig. 7b

March 23, 1954   H. L. LESIGNE   2,673,234
AUTOMATIC SWITCHING SYSTEM APPLICABLE TO TELEGRAPHY
Original Filed March 16, 1946   11 Sheets-Sheet 11
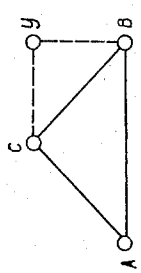
Fig. 11
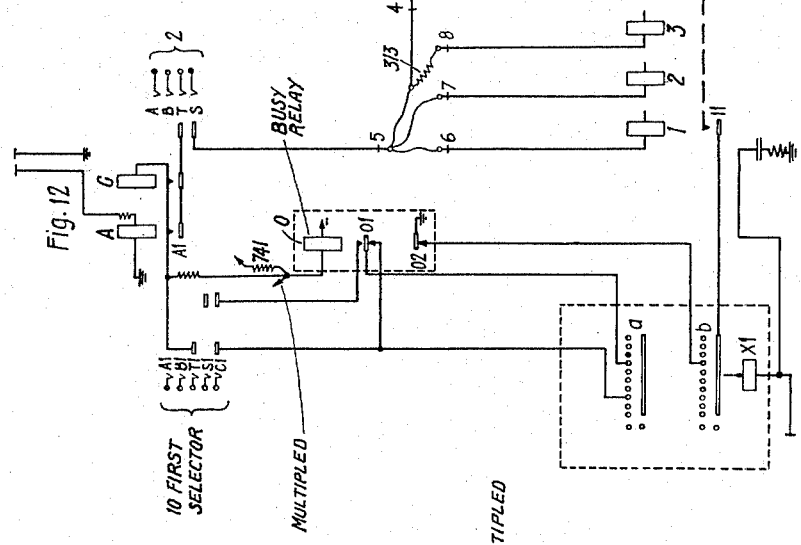
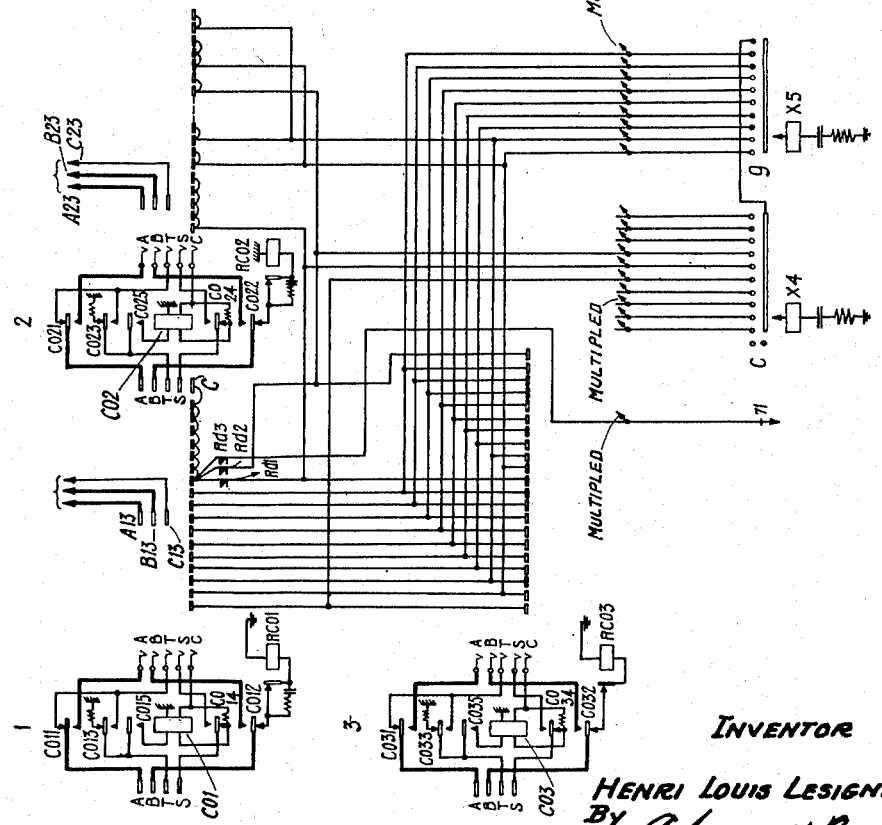
INVENTOR
HENRI LOUIS LESIGNE
BY Adams & Bush
ATTORNEYS Patented Mar. 23, 1954

2,673,234

UNITED STATES PATENT OFFICE 2,673,234

AUTOMATIC SWITCHING SYSTEM APPLICABLE TO TELEGRAPHY

Henri Louis Lesigne, Vanves (Seine), France, assignor to Compagnie Generale d'Electricite, Paris, France, a corporation of France Original application March 16, 1946, Serial No. 654,845, now Patent No. 2,529,166, dated November 7, 1950. Divided and this application October 11, 1950, Serial No. 189,547. In France March 31, 1953

Section 1, Public Law 690, August 8, 1946
Patent expires March 31, 1963

14 Claims. (Cl. 178—2)

This application is a division of my U. S. Patent No. 2,529,166, dated November 7, 1950.

The present invention relates to automatic switching systems more particularly applicable to telegraphy.

It relates, especially, to that kind of automatic switching which is the subject of my British specification No. 668,261.

In telegraphic systems, the supervision relays arranged in series or in shunt on the wires of the line are generally polarised permanent magnetic relays which present the inconvenience of being expensive and require delicate regulating.

The present invention replaces these polarised permanent magnet relays by more economical and stable relays with a shunted magnetic field. These relays have the quality of attracting their armature when the two coils are traversed by a current of the same sense. They fall back when the currents are of an opposite sense. These relays are used in the equipment of telegraph stations in equipment known as a "Connection Circuit" or "Link Circuit" and in the device known as a "Recorder" or "Register."

Furthermore, the call-relay employed is a non-polarised relay with a magnet or electromagnet which permits discrimination of the direction of current through the line, the control of the passage of current through that line, and operation only in a determined direction.

One of the functions of the recorder is also to discriminate between stations according to their category. In the first category no charge is effected, whereas in the second category, a charge must be made. The recorder then sends the signals necessary for determining that charge. These signals are sent either locally, if the calling station is connected to the local automatic switch (this word here designating the switching office or station), or over the line to the calling station, if this is connected to another automatic switch. The signals sent locally to the recorder which prints the duration of the communication indicates: the number of the called station, whether the called station has been found free or occupied, or whether the calling station is connected to overflow equipment, and to which overflow equipment the calling station is connected. If the calling station is not connected to the automatic switch of the calling station, impulses are sent over the line to a remote automatic switch appropriated to the station of the calling subscriber. The number of the impulses sent varies according as the station of the called subscriber has been found free or occupied, or the calling subscriber is connected to overflow equipment. In the last case, the number of impulses sent varies according as the overflow relates to the first, second or third figure (or digit), thereby indicating also to the printing recorder in which stage of selection the overflow has occurred.

The recorder also permits the sending of a characteristic signal if the required station is occupied.

The present invention also envisages the possibility of indicating to the recorder that an operation is to be effected in a stage of selection, or to pass on from that stage of selection without the necessity of effecting a translation of the figures received in the recorder.

Furthermore it permits the changing of the route of a communication when the direction which it should ordinarily take is occupied. Nevertheless, the change of route cannot take place for communications which come from certain directions.

The present invention also comprises a device called a "Discriminating Recorder," the purpose of which is to replace the recorder in automatic switches when there is little local traffic, and when the traffic is in great measure shunted to another office. This device fulfills the same functions as the recorder in the establishment of local communications.

The invention permits the substitution, in an automatic switch, for a recorder (that is, a device which permits the reception and the retransmission of the figures received in transit without it being necessary that the selector or connector should be connected to an outgoing line), of a discriminating recorder, that is, a simple device, placed in series or in shunt with the line, and which determines whether the communication is local or in transit. This change may be effected without alteration of the cables. The recorder and the discriminating recorder being mounted on interchangeable flanges.

The present invention also provides for a recorder for charged communications, the purpose of which is to receive the impulses which determine the called station, to search by means of one or two seekers also called "finders," according to the importance of the office, for the number of the calling station, and to receive impulses indicating the development of the communication: for example, requested station free, requested station engaged, transmission to overflow equipment in a local automatic switch, transmission to overflow equipment, whether at the first, second or third selection. It retransmits these impulses to a group of devices called a printing recorder. It controls the placing in position of various elements provided with wheels with printing characters which form this group. It controls the printing, on a band of paper, of the calling and called numbers, or of the place at which overflow occurs and the time when the communication begins.

The task of the recorder for charged communications is, furthermore, to search for the calling stations by a testing circuit provided at each station or at each finder.

The present invention relates equally to a printing recorder which comprises a very restricted number of elements and which is controlled by the recorder of the charged communications and remains connected to the connection circuit during the whole duration of the communication.

It comprises the following:

Electromagnets provided with wheels with printing characters which determine first the number of the called station, then with the same elements the number of the calling station, these being transmitted to it by the recorder of charged communications.

An electromagnet for printing the calling and called stations.

An electromagnet provided with a wheel with printing characters which indicate the development of the communication, that is, which show whether the called station is free or engaged, or whether it has been retransmitted to overflow equipment, and, in that case, whether overflow has occurred at the first, second or third stage of selection.

An electromagnet for pringing the position of the communication.

An electromagnet controlled by time-mechanism for indicating the time.

An electromagnet for printing the time.

An electromagnet for advancing the band.

It comprises, furthermore, four relays for the establishment of the connection between the recorder and the connection circuit, for the release of the electromagnets, and for recording the time at which the communication has ended.

The present invention affords the possibility of increasing the number of lines connected to an automatic switch without increasing the number of the figures which serve to effect the selection. Several lines may be assigned to the same calling number, but the number of figures which may be thus assigned need not be diminished.

According to a particular feature of the invention, one and the same selection figure may serve for two successive stages without retransmission of that figure, since the numerical elements, also called "digit switches," of the recorder which orient the selection elements may be used once or more.

In the second instance, the invention permits the orientation of a selector in a given direction by making use of different figures, these figures being able to control the different directions at the succeeding stage of selection.

These various features of the invention and also others will appear and be better understood by a perusal of the following description which relates to an application of the system and is given by way of example and by reference to the drawings attached to the text.

Figs. 2, 3, 4a, 4b, 5a and 5b, 6 and 7, are detailed complementary schematic drawings and are related according to the sketch of Fig. 1.

Fig. 2 represents a control box for a telegraph station.

Fig. 3 shows the two special relays at each station, the input of the line to the automatic switch, the equipment of the call finder, the equipment of the connection circuit with the equipment of the connection circuit and the first selector and the equipment of the connector.

Figs. 4a, 4b, 5a and 7b illustrate a recorder.

Fig. 6 illustrates a supply element operated by rectified current and allotted to each recorder. This element has been described in the above mentioned British specification No. 668,261.

Figures 7a and 7b show a recorder for charged communications.

Fig. 10 illustrates the connection of control wires when a secondary connector is employed.

Figs. 11 and 12 illustrate a device for changing the route of a communication.

Figure 1:
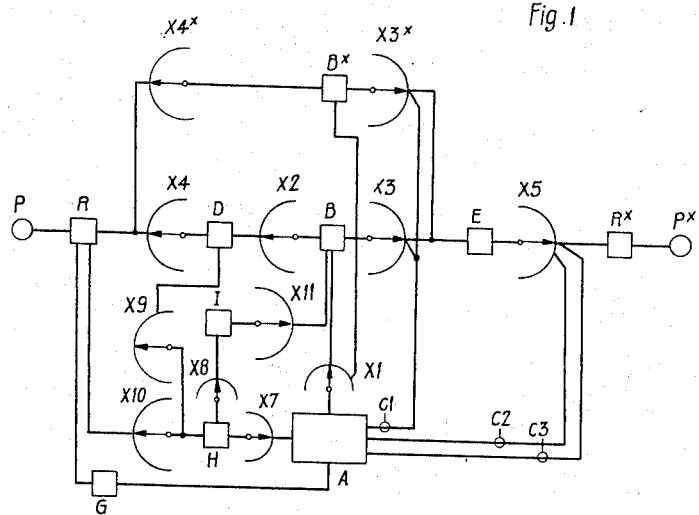
Fig. 1 is a schematic arrangement of elements entering into communication in the case where a recorder and a call finder are employed.
Figure 1A:
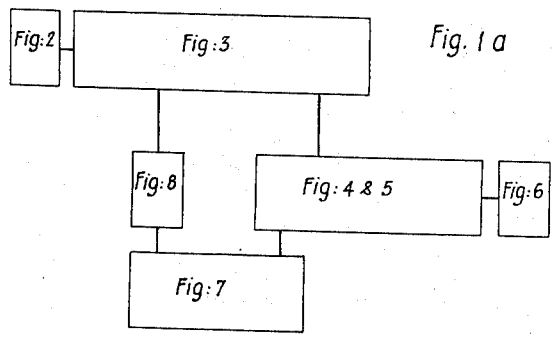
Fig. 1a is an assembly diagram showing how Figures 2, 3, 4, 5, 6, 7, 8, fit with relation to each other.

The group of elements which enter into the establishment of a communication as shown in Fig. 1, consists essentially of the control-box of a calling station P, of its line equipment (call and metering relay) R, starting relays G, the recorder A with the finder of the recorder X1, of a connection circuit B with the finder of the connection circuit X2, or of a connection circuit B' with its finder X4'.

The connection circuit B' is exclusively appropriated to an element relating to a figure in the hundreds. It is metallically connected to a call finder X4' fitted to the element in question.

The group of elements entering into the establishment of a communication comprises furthermore:

A call finder DX4.

A first selector with its rotary switch X3.

The group of primary selectors X3 is connected to the group of recorders A by control wires C1.

A connector E with its rotary switch X5.

The group of selectors or connectors is connected to the group of recorders A by control wires C3 and C4.

The line equipment of the called station R'.

A control box of the called station P'.

A recorder for charged communications H with its finders: that of the recorder X7, that of the printing recorder X8, and the finders of the calling station X9 and X10.

A printing recorder I with its finder X11.

The illustrated installation is for three selections. For four selections there should be an additional selector. For six figures two further selectors etc., but for two figures there would be no first selector.

The function of the system is in its broad lines as follows:

The operator of the calling station pushes down a call button but does not disconnect the control box of the station. He thereby excites the line relay of the station which operates the starting relays, these in turn closing the starting circuit towards a free recorder. The recorder searches in its turn for a free connection circuit, then by means of the finder of the connection circuit for a free call finder on the bank on which the line of the calling station is located. Thus the recorder shunts the call finder over the line of the calling station. Whilst the operations of preselection of the calling subscriber are being effected, a recorder for charged communications searches for a recorder and is temporarily connected thereto. It then searches for a printing recorder which in its turn searches for the connection circuit with which the assembly of a recorder and a recorder for charged communications is connected. A stand-by current is then sent over a wire of the calling station. The reception of this current at the calling station effects: starting up of the motor of the teleprinter, connection of the telegraph line with the teleprinter through the control box. The operator then releases the call button of the control box, and dials the number of the called station, which may consist of three figures, as follows:

The first figure is received in the recorder by numerical element allotted to thousands. The first selector is oriented, by means of the control wires on the corresponding network to the same position as the numerical element allotted to thousands, then it searches for a free connector in the group in question. The second and third figures are received by numerical elements respectively allotted to tens and units, and orient the connector on the called line.

The various selections are similarly received by the recorder for charged communications, which orients electromagnets of the printing recorder these being provided with wheels and printing characters and which prints the number of the called station on a band of paper.

In the meantime, the recorder for charged communications has searched the calling line and is cognizant of the number of the caller by the azimuthal position of its hundreds' and subscribers' finders. It orients the electromagnets of the printing recorder which are provided with printing characters and prints the number of the calling station. If the called station is free, it is called up by transmission of current of positive polarity over one of the wires of the line.

Reception of positive current at the controlbox of the called station starts the motor of the teleprinter associated with that station, and connects the telegraph line with that teleprinter.

A characteristic signal is then transmitted by the recorder to the called station. Reception of this signal stops the transmission by the called station of the indicative signal of that station which is sent out to the calling station and received by the recorder also. The recorder then transmits the same characteristic signal to the calling station, and thereupon establishes a connection in the connection circuit the two telegraph lines being by this means connected with each other.

The recorder for charged communications then records on the printing recorder the time when the communication begins.

Then the recorder and the recorder for charged communications are released, leaving the printing recorder connected to the connection circuit during the whole duration of the communication. Upon the release of the elements at the end of the communication, the printing recorder marks the time when the communication ends, and is thereupon released.

In the detailed description which follows the letter $r$ preceding the number of a contact spring of a relay indicates the contact established by the spring when the relay is at rest (not excited) and the letter $t$ the contact established by this spring when the relay is at work. In this specification, the same relay and its contacts may be designated in any one of three different manners, according to its being considered independently of its condition of energization or, de-energization, or considered to be in an energized condition or in a de-energized condition. The designation of the relay in the first case will include neither the letter "$t$" nor the letter "$r$" but, in the latter two cases will include either the letter "$t$" or the letter "$r$."

Figure 2:
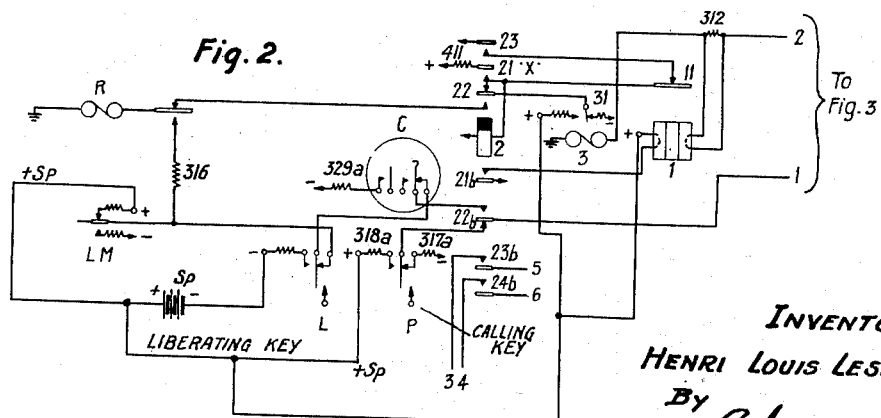

It may be assumed, for instance, that a station wants to reach another station, the number of which is 25681. Referring now to Fig. 2, the operator at the calling station presses down the call button P of the control-box of the station. C is the dial of the calling subscriber's station.

The pressing down of this button places a positive polarity (a stand-by telegraphic) on wire 1 of the station and starts the relay of line A (Fig. 3) by means of the following connections:

(Fig. 2), the positive resistance of the battery, the working contact of button P which is kept locked, $r22$ and wire 1.

(Fig. 3), the winding RC3 of relay A, the rectifier A$x$ operating in the same direction as the current, and ground.

Relay A attracts armature and closes the circuit of the starting relay M1 as follows:

Ground, $tA2$, the winding of M1 and the battery.

Relay M1 sets a distributor (not shown on the drawing) in operation, by means of the following connections:

Ground, M12, $rT1$ and point 7.

The ground connection is cut off as soon as relay T is excited, by means of the following connections:

Ground, $tM12$, the winding of relay T and the battery.

The entry into action of relay M1 establishes a test circuit on the call finders which have access to the group of which the calling station is a part, as follows:

Ground, M11, $rM21$, the resistance $rC23$, and the bank of the finder of the connection circuit explored by the brush T.

On the other hand, relay MC is grounded, and the following connections are established:

Ground, $rM21$, $rC26$, the resistance, the winding of MC2 and the battery.

Relay MC2 is common to all call finders of the same group. It prepares the operational circuit of relay MC1. Relay MC1 is common to all connection circuits explored by the same recorder. The plug M which is common to all the connection circuits which have access by their finders to the call finders of a group in which a subscriber is being called, is brought to positive polarity thereby indicating a free line by means of the following connections:

Ground, $tMC21$, the resistance, $r21'$, and plug M on the bank of recorders.

The traffic distributor, by means of connections:

Ground, $tMC11$ and point 8, rotates automatically searching for a free recorder. Its brushes stop on the azimuthal position which corresponds to a free recorder.

Relay 9 of the recorder (Fig. 4) then enters into action by means of connections:

Ground, tMC12 (Fig. 3), point 11 (Fig. 4), point 25, the coil in the traffic distributor which is not shown in the drawing, point 26, sector A of switch X5 in its rest position, sector A in rest position of switches X1, X2, X3 and X4, wire 62 (Fig. 5) sector C in rest position of switch X7, contact G of the mixer (sequence switch) X6 in position 0, wire 58 (Fig. 4), the winding of relay 9 and the battery.

By means of contact t92, relay 9 is held independently of the traffic distributor which has effected its attraction, as follows:

Ground, tMC12 (Fig. 3), point 11 (Fig. 4), t92, the rest position of numerical elements X5, X1, X2, X3 and X4, wire 62 (Fig. 5), sector C of X7 in its rest position, contact G of the mixer X6 in its rest position, wire 58 (Fig. 4), the winding of relay 9 and the battery.

Figures 4, 4B, 5, 5A:
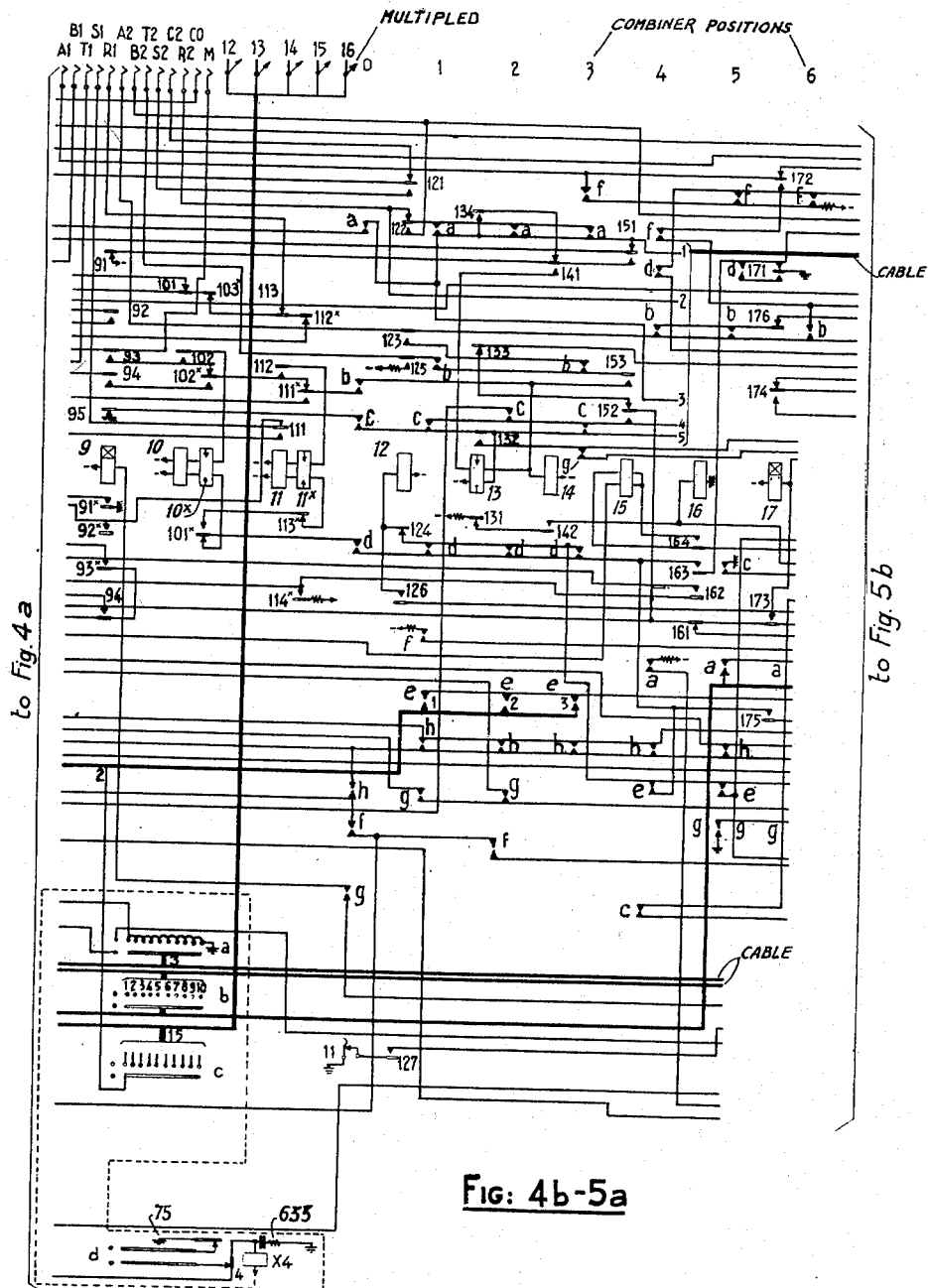

As long as the relay MIC (Fig. 3) is working, that is as long as the call continues which brings a connection circuit on the bank of a recorder into action, relay 9 is attracted (see Fig. 4). It returns to rest either because the recorder of which it forms part, establishes connection with the calling station, or because another recorder is connected to the calling station, and thus blocks the operation of the recorders.

Relay 9, when in operation, effects the excitation of relay 13 by means of the following connections:

Ground, t95, wire 42 (Fig. 5), contact C of mixer X6 in position 0, the lower winding of relay 13 and the battery.

Rotary switch E begins to rotate automatically and searches for a connection circuit in which plug M has positive polarity. Its rotation circuit is closed, as follows:

(Fig. 4), battery, t91, wire 37 (Fig. 5), r141, t134, contact A of mixer X6 in rest position, wire 35 (Fig. 4), r77', r101, the interrupter, the winding of E and the battery.

The rotation circuit of switch E is opened, upon the closing of the blocking circuit, at the time when brush M passes a contact corresponding to a connection circuit which has access to the called group. Relay 14 is excited by means of the following connections:

(Fig. 3), ground, tMC21, the resistance R21', contact M brush M (Fig. 4), t93, r102', r111', wire 41 (Fig. 5), contact C of mixer X1 in position 0, the winding of relay 14 and the battery.

By means of contact r141, the rotation of E is interrupted. On the establishment of contact t141, relay 14 connects the upper winding of relay 13 to the battery, wire 37 (Fig. 4), t91 and the battery. The other end of its winding is connected to wire E, and current flows through the two windings of relay 13. The relay 13, the two windings of which are arranged differentially, falls back when the flux produced by the upper winding cancels the flux produced by the lower winding. This condition is fulfilled if none of the other relays 13 is connected to the same point E.

On the other hand, the upper winding of the relay 13, which is a low resistance winding, shunts the winding of relay 14. The potential of test plug E consequently falls to a value near the potential of the negative pole of the battery. The connection circuit is thus protected against engagement by another recorder. Relay 13 at rest and relay 14 in operation characterise the engagement of an unoccupied element.

In the opposite case, relay 14 falls back, these relays being designed in such a manner that two of the relays 14 are not able to operate simultaneously, since each is shunted by the winding of relay 13.

Excitation of relay 14 and de-energization of relay 13 effect the attraction of relay 16 as follows:

The battery, resistances r131, t142, the winding of relay 16 and ground.

By means of the following circuit: ground, r171, t163, contact D of mixer X6 in position 0, wire 43 (Fig. 4) and r101, the energising circuit of relays 10 and 10' is closed, their lower windings being arranged in series. Relay 10', the attraction of which is delayed, will not yet have attracted its armature when the contacts of relay 10 are already established. By means of contact t102, the upper windings of relays 10 and 10' are connected in branch with point M. Relay 10 is held by its upper winding, but relay 10', the windings of which are arranged differentially cannot operate, and its armature is left at rest. But relays 10 and 10' are connected by contact t102 in shunt to the group formed by relays 13 and 14. Relay 14 being shunted, relay 13 functions again, and opens the circuit of relay 16 which then falls back. The grounding of the lower windings of 10 and 10' effected by contact t163, is interrupted. Relay 10' attracts its armature. The two relays 10 and 10' are held in working position by means of the following connections:

The upper windings of 10 and 10', t102, t93, brush M, contact M (Fig. 3), r21', resistance tMC21 and ground.

The rotation circuit of the finder in the connection circuit is thus closed, as follows:

(Fig. 4), the battery, t91, wire 37 (Fig. 5), r141, t134, contact A of mixer X6 in position 0, wire 35 (Fig. 4), r77', t103', r113, brush R1 of the finder of the connection circuit, contact R1 (Fig. 3), the interrupter, the winding of the electromagnet RC1 and ground.

Rotary switch RC1 participates in the search for a free finder which has access to the called line, on the passage of brush T over a free call finder characterised by the positive battery on plug M. Relay 14 of the recorder (Fig. 5) is energised by means of the following connections:

(Fig. 5), the battery, the winding of relay 14, contact 6 of mixer X6 in position 0, wire 41 (Fig. 4), r111', t102', t94, r73', brush T1 of the finder of the connection circuit, contact T1 (Fig. 3), the brush and bank T of the finder of the connection circuit rC23, resistance rM21, tM11 and ground.

Relay 14 of the recorder (Fig. 5) then comes into operation. By means of contact r141, it opens the rotation circuit of the finder of the connection circuit. Armature 141 of relay 14 shunts the upper winding of relay 13, which is a low resistance winding, across the winding of relay 14. The potential of the test plug consequently falls to a value near the potential of the negative pole of the battery. The call finder is thus protected against engagement by another connection circuit.

Relay 13, which is a differential relay, falls back, because the fluxes which its two windings produce balance each other exactly.

Relay 13 at rest and relay 14 in operation close the attraction circuit of the relay 16 by the following connections:

The battery, resistance, r131, t142, the winding of relay 16 and ground.

They also close the attraction circuit of relay 11 by the following connections:

Ground, r171, t163, contact D of mixer X6 in position 0, wire 43, t101', r113', the lower windings of relays 11' and 11 and the battery.

Relays 11 and 11' operate in the same way as relays 10 and 10'. Relays 13 and 14 are shunted by the windings of relays 11 and 11'. Relay 13 is again excited and opens the attraction circuit of relay 16 which therefore falls back. Relay 11', the lower winding of which is isolated from ground by means of contact t163 then begins to operate under the influence of its upper winding. Relay 8 then functions by means of connections:

The battery, the two windings of relay 8 in series t111', brush S1 of the finder of the recorder, contact S1 (Fig. 3), the brush and bank S of the finder of the connection circuit, rC24, the winding of relay C2 and ground.

Relay C2 cannot begin to operate, because the resistance of the two windings of relay 6 is too great to permit of its functioning. Relay 6 of the recorder therefore closes the rotation circuit of the call finder RC2 as follows:

(Fig. 4), the battery, t91, wire 37 (Fig. 5), r141, t134, contact A of mixer X6 in position 0, wire 35 (Fig. 4), r77', t183', t112', t83, brush B1 of the finder of the recorder, contact B'1 (Fig. 3), the brush and bank B of the finder of the connection circuit, rC22, the interrupter, the winding of RC2 and ground.

The call finder RC2 begins to rotate automatically when exploration of the calling line starts. This line is characterised by a polarity which may be called a blocking polarity on contact T of the back of the call finder. Relay 14 of the recorder then functions by means of the following connections:

(Fig. 5), the battery, the winding of relay 14, contact 6 of mixer X6 in position 0, wire 41 (Fig. 4), t111', t82, r201, r172, brush A1 of the finder of the recorder, contact A1 (Fig. 3) the brush and bank A of the finder of the connection circuit, rC21, brush T of the call finder, and contact T which corresponds to the called line T.

The rotation circuit of the call finder is opened by means of contact r141, and blade 141 of relay 14 shunts the upper winding of relay 13, which is a low resistance, across the winding of relay 14. The potential of plug T of the calling line consequently falls to a value near the potential of the negative pole of the battery. The called line is thus protected against engagement by another connection circuit.

Relay 13, which is a differential relay, falls back, because the flux produced by its two winding, balance exactly.

Relay 13 at rest and the relay 14 in operation close the attraction circuit of relay 16 via:

(Fig. 5), the battery, resistance r131, r142, the winding of relay 16 and the battery.

The circuit of relay 3 of the recorder (Fig. 4) is then closed via:

Left hand coil, ground, t91', the winding and the battery.

Right hand coil, the positive current, the resistance t114', wire 45 (Fig. 5), t162, wire 44 (Fig. 4), t81, the right hand winding and ground.

Relay 3 which is a relay with a shunted magnetic field, and the windings of which are traversed by current of any desired direction, comes into operation.

Operation of relay 3 effects attraction of relay 4 by means of the following connections:

(Fig. 4), ground, the lower winding of relay 4, t31, the resistance wound on relay 5 and the battery.

Relay 4 closes a holding circuit by means of contact t44, and contact t42 establishes the circuit of the left hand coil of relay 3, which is open at t91 as soon as relay 9 is released at the end of the preselection operation.

By means of contact t43, it excites relay 7, which connects the recorder of the calling line.

By means of contact t79' (Fig. 4), relay 7 engages the connection circuit with wiper M. A battery in series with a resistance is connected to wire T1 to hold the connection relays by means of contact t73'. By means of contact t79, relay 7 short-circuits the upper winding of relay 8. Relay C2 (Fig. 3) of the call finder, in series with relay 8, then begins to operate, and by means of its working contacts it establishes the connection of the calling station with the recorder by means of the following connections:

(Fig. 4), ground, the right hand winding of relay 3, t78', wiper B of the finder of the recorder, contact B (Fig. 3), r21, the brush and bank B of the finder of the connection circuit tC22, the brush and bank B of the call finder, wire B, point 1 (Fig. 2), r22, the working contact of button P, the resistance and positive pole.

Relay 3 of the recorder (Fig. 4) is held in operation. Relay 14 of the recorder having had its circuit open at rC21 (Fig. 3) falls back, and at t142 (Fig. 5) it opens the attraction circuit of relay 16 which also falls back, thereby opening at t162 the attraction circuit of relay 3 which remains under the effective control of the calling station, this being a station for charged communications. Relay 1 of the recorder begins to operate by means of the following connections:

(Fig. 6), the secondary of transformer TF1, the rectifier RD1, RD2 in the same direction as the current, point 23 (Fig. 4), t72', t92', r111', brush S1 of the finder of the recorder, contact S2 (Fig. 3), brush S and bank S of the finder of the connection circuit tC24, the brush and bank S of the call finder, the resistance, point b, point t10 (Fig. 4), r114, the lower winding of relay 1, the rectifier RD1 in the same direction as the current, t94', t72, point 24 (Fig. 6), either rectifier Rd3 or Rd4 and the secondary of the transformer.

Relay 1 begins to operate and closes its holding current by means of the following connections:

Ground, t71, the upper winding of relay 1 and the battery.

Thus relay 1 puts the recorder for charged communications (Fig. 7) into operation by means of the following connections:

(Fig. 4), ground, t13, the resistance, point 122a (Fig. 7), r83, contact b of the mixer X1 in position 0, the winding of relay 2 and the battery.

Relay 2 closes the circuit of the differential relay 3 which begins to operate by means of the following connections:

Ground, t21, contact d of mixer X1 in position 0, the lower winding of 3 and the battery.

The circuit of the switch RC is then closed as follows:

The battery, r41, t33, t23, the contact-breaker, the winding of CE and ground.

The switch CE participates in exploration of the recorder since it is connected with a connection circuit which is itself in connection with the called line. This recorder is characterised by a positive polarity on its wire M (Fig. 4), ground, t113, the resistance, and bank M. When the wiper M of the finder CE passes over the contact M which corresponds to this recorder, relay 14 of the recorder for charged communications begins to operate by means of the following connections:

(Fig. 7), the battery, t32, t22, the brush M and bank of CE (Fig. 4), the resistance, t13 and ground, and it closes a holding circuit by means of its element t43.

Figure 7A:
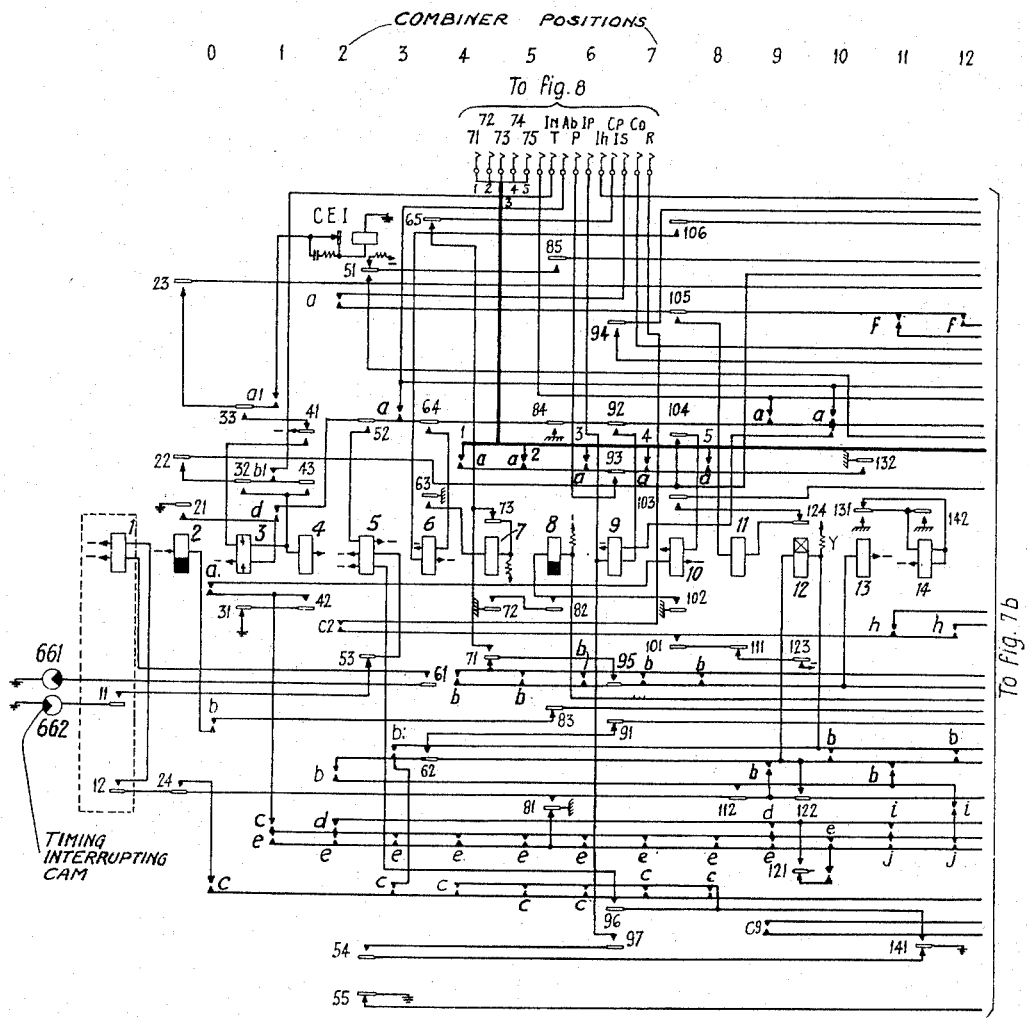
Figure 7B:
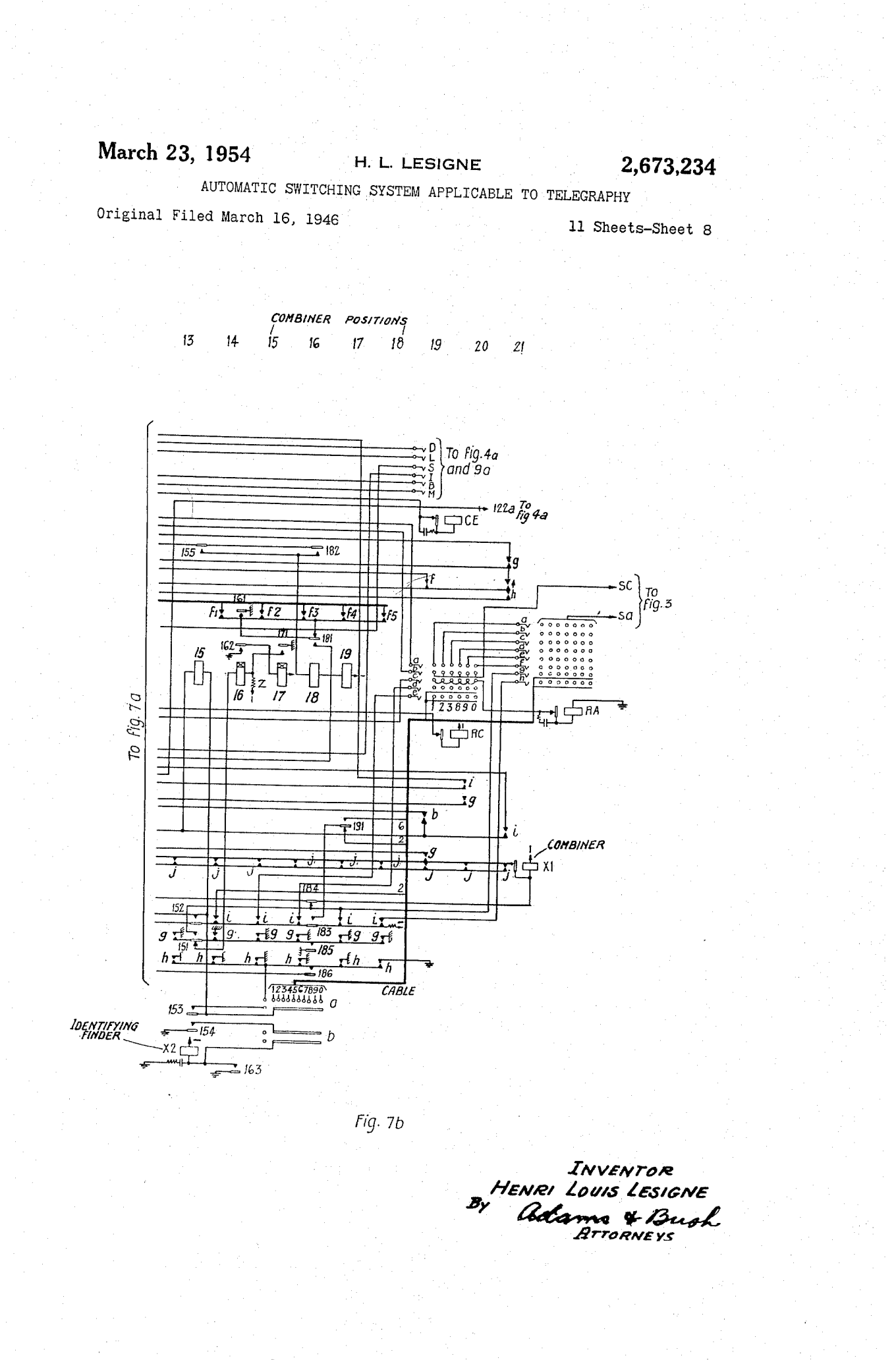

The rotation circuit of finder CE is open at r41 (Fig. 7). By its blade 41, relay 4 places the upper winding of relay 3 which is of weak resistance in shunt with the winding of relay 4. The potential of the plug consequently falls to a value near the potential of the negative pole of the battery.

The recorder is thus protected against engagement by another recorder for charged communications.

Relay 3, which is a differential relay, then falls back, because the flux produced by its winding balance exactly.

Relay 10 (Fig. 7) then begins to operate by means of the following connections:

Ground, r31, t42, contact a of mixer XI in position 0, the lower winding of 10 and the battery and it closes a holding circuit by means of t104, the wiper and bank M of finder CE (Fig. 4) the resistance, t13 and ground.

Relay 8 then begins to operate by means of the following connections:

Ground, t102, the winding of 8 and the battery.

The circuit of the electromagnet of mixer XI is closed as follows:

Ground, t24, contact c of mixer XI in position 0, the winding of XI and the battery. Mixer XI then attracts its armature.

On the other hand, the attraction circuit of relay 2 is opened at r83, and relay 2 which has a release, overcomes its delay and falls back, thereby opening at t24 the attraction circuit of switch XI which then releases its armature and brings its brushes into position 1.

Relay 3 operates under the action of its lower winding the circuit of which is again closed as follows:

The battery, the lower winding of relay 3, contact d in position 1 of XI, t84 and ground.

Exploration for a printing recorder then begins, because the rotation circuit of finder REI is closed as follows:

The battery, r41, t33, contact a in position 1 of XI, the circuit breaker, the winding of REI and ground.

Figure 8:
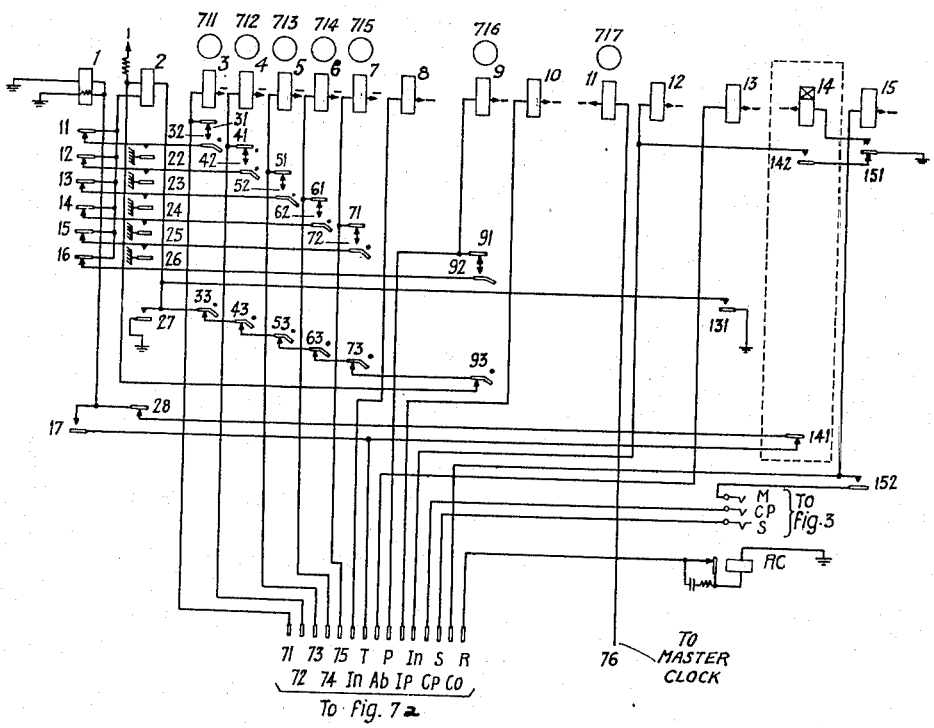
Fig. 8 illustrates a recorder for printing the duration of a communication.

Switch REI participates in exploration for a free printing recorder. A free printing recorder is characterised (Fig. 8) by a ground connection on the contact T of the bank of the finder REI as follows:

Ground, the winding in parallel of relay 1, r21, r141, and contact T.

When the wiper T of the finder REI passes over the contact T which corresponds to a free printing recorder, relay 4 of the recorder for charged communications begins to operate by means of the following connections:

The battery, the winding of the relay 4, t32, contact b of mixer XI in position 1, wiper T (Fig. 8), contact T, r141, r21, the two windings of relay 1 and ground, and it closes a holding circuit at T43.

The rotation circuit of switch REI is open at r41.

By means of its blade 41 relay 4 places the upper winding of relay 3 (which is a winding of weak resistance), in shunt with the winding of relay 4. The potential of the test plug consequently falls to a value near the potential of the negative pole of the battery.

The printing recorder is thus protected against engagement by another recorder for charged communications.

Relay 3, which is a differential relay, then falls back, because the flux produced by its windings is exactly balanced.

Relay 3 at rest and relay 4 in operation in position 1 characterise the end of exploration for a free printing recorder. Mixer XI has its circuit closed as follows:

Ground, r31, t42, contact c of mixer XI in position 1, the circuit-breaker, the winding of XI and the battery.

Mixer XI then brings its wipers into position 2. In this position exploration for connection circuits in engagement with the calling line and the recorder is effected.

The rotation circuit for the finder of the printing recorder is closed as follows:

(Fig. 7), the battery, r123, r111, t101, contact c of mixer XI in position 2, wiper R of finder CEI, contact R of the circuit-breaker bank, the winding of Rc and ground.

Switch RC participates in the search for a connection circuit in engagement with the recorder. The connection circuit is characterised in that its wire S has a common point with wire S of the recorder.

When wiper S of the finder of the printing recorder passes over the wire S which corresponds to a connection circuit associated with a recorder connected with the recorder for charged communications, and with which the printing recorder itself is momentarily associated, relay 11 of the recorder for charged communications (Fig. 7) begins to operate by means of the following connections:

(Fig. 6), the secondary of TFI, rectifier RDI or RD2 in the same direction as the current, point 23 (Fig. 4) t72', r111, wiper S1 of the finder of the recorder, contact S1 (Fig. 3), contact S of the bank of the finder of the printing recorder, wiper S of RC (Fig. 8), contact S of the bank of the finder of the recorder for charged communications, wiper S (Fig. 7), contact a of mixer XI in position 2, t105, the winding of relay 11, r24, t103, wiper S of the finder of recorder CE, contact S of the bank (Fig. 4), t16, rectifier RDI in the same direction as the current, t72, point 24 (Fig. 6), rectifier Rd4 in the same direction as the current, and the secondary of transformer TFI.

Relay 11, at r111 opens the rotation circuit of the finder of the printing recorder RC which stops its wipers on the designated connection circuit.

The circuit of the crossing relay is then closed as follows:

Ground, t81, t112, contact b of mixer XI in position 2, the winding of relay 12, the resistance and the battery.

The circuit of mixer XI is closed as follows:

Ground, t121, contact d of mixer XI in position 2, the circuit-breaker, the winding of XI and the battery.

Mixer XI then brings its brushes into position 3.

Since relay 11 has had its circuit open at r124, it falls back, and by means of contact t112, it opens the circuit of relay 12, which is held in operation notwithstanding its delay. In this position the circuit of the electromagnet which advances the band of the printing recorder is closed as follows:

(Fig. 7), ground, t84, contact a of mixer XI in position 3, wiper Ab of finder REI, contact Ab (Fig. 8), relay 13 and the battery.

Relay 13 advances the band. At the same time, mixer XI having attracted its armature, its circuit of attraction is closed as follows:

Ground, t81, t122, contact c of mixer XI, the winding of the electromagnet XI and the battery.

Relay 12, the circuit of which is closed via: Ground, t81, t22, contact b of mixer XI in position 3, the winding of relay 12, t122, t81 and ground, exhausts its period of delay and falls back, and at t122 it opens the attraction circuit of electromagnet XI which thereupon releases its armature, and brings its wipers into position 4.

At this moment the operator of the calling station must be informed that he can compose on his dial the number of the station which he wants to reach, say: 25881.

One of the wires of the line is then connected to the positive pole of the battery, due to the following connections: (Fig. 7) the positive terminal of the battery, the resistance, r51, t85, wiper b of finder CE, contact b (Fig. 4), t111, r82, R1, wire 30 (Fig. 5), r201, r172, wire 31 (Fig. 4), brush A of the finder of the recorder, contact a (Fig. 3), the wiper and contact A of the finder of the connection circuit, tC21, the wiper and contact A of the call-finder, wire A, point 2 (Fig. 2, the resistances of the winding of relay 1 in series with the line, the winding of the telegraphic relay 3 in series and ground.

The polarised relay 3 reciprocates its armature which comes into contact with its positive stop.

Then the relay 2 begins to operate by means of the following connections:

The positive terminal of the battery, the resistance, the positive stop of relay 3, r23, the wind of 2 and the battery.

Relay 2 closes a holding circuit by means of contact r21, the resistance and the positive terminal of the battery.

By means of its contact r21, relay 2 closes the circuit of the left hand coil of relay 1 which has a shunted field. This relay, the two coils of which are traversed by current of the same direction, begins to operate, and at r11 it opens the release circuit of relay 2. At t22' and t23', relay 6 connects the telegraphic circuit with the teleprinter across the junction-box. At t23' and t24', relay 6 establishes a connection between the motor situated at points 5 and 6 and the supply situated at points 3 and 4. The start of the motor of the teleprinter indicates to the operator that a recorder is connected to its line. He ceases to press down the call button of teleprinter P.

The operator then composes on the dial of the control-box the number of the called station.

*Reception*

The operator uses his dial to composes the first figure of the required station, i. e. the 2 in the before-mentioned example. During its return to rest the dial C (Fig. 2) sends out two impulses of double current over the wire I. These impulses of double current strike relay 3 of the recorder (Fig. 4). Relay 3 is a relay with a shunted magnetic field which falls back at each emission of negative current. These pulses are sent by means of the following connections:

Negative current, the resistance, the left hand contact of the dial C (Fig. 2), t22', wire I (Fig. 3), contact B and wiper B of the call finder, tC22, contact B and wiper B of the finder of the connection circuit r21, contact B1 of the bank of the finder of the recorder (Fig. 4), wiper B1, t78', the right winding of relay 3 and ground.

The first release of relay 3 determines the start of the operation of relay 5 by means of the following connections:

Ground, r31, t44, the winding of relay 5, the resistance wound on relay 5 and the battery.

Relay 5 is short-circuited at each attraction of relay 3, but its delay is consequently greater than the duration of a closing impulse, so that relay 5 cannot fall back during the transmission of a train of pulses. It only falls back when the operator of the calling station uses his dial for transmission of the next figure.

The circuit of the electromagnet of the entrance distributor X5 is closed as follows:

Ground, t41, t51, sector f of X5, the winding of X5 and the battery.

The electromagnet X5 attracts its armature and remains in this position till the release of relay 5 which takes place at the end of the reception of the train of pulses which represent the figure to be received, in this case the figure 2.

The circuit of the numerical element corresponding to tens of thousands is closed as follows:

Ground, t41, r32, wiper a of distributor X5 in position 1, wire I, the winding of switch XI and the battery.

At each emission of negative current by the dial of the calling station, relay 3 is de-energized. This relay is, on the other hand, attracted at each emission of positive current.

The circuit of the numerical element XI is, therefore, established at each emission of negative current. It follows therefore that the numerical element XI performs as many steps as there are unities in the retransmitted figure.

In the example chosen the numerical element XI makes two steps and brings its wipers into position 2.

Relay 5, which is short-circuited for a long time, exhausts its period of delay and is de-energized, thereby opening at t51 the attraction circuit of the entrance distributor X5 which releases its armature and brings its wipers into position 2; this disconnects the numerical element X2 corresponding to thousands.

The second figure is received by X2 in a manner identical to that described for the reception of the first figure.

The same applies to the third and fourth figures which are received by numerical elements X3 and X4. The entrance distributor X5 after having effected distribution of the four first figures to the numerical elements XI—X2—X3—X4 brings its wipers into contact with sectors b—d—c—g and i— by means of the following connections:

Ground, positions 5—6—7—8—9 and 10 of sector a, the circuit breaker, the winding of XI and the battery.

In this position switch X5 receives the pulses which determine the unit figure by means of the following connections:

Ground, t41, r32, t52, the winding of X5 and the battery, and brings the wipers into a position determined by the number of the received impulses (in the example chosen, the figure 1).

After transmission of the last figure the numerical elements of the recorder are in the following positions:

X1 in position 2.
X2 in position 5.
X3 in position 8.
X4 in position 8.
X5 in position 1.

At the end of the selection the operator of the calling station receives the signal of the required station if the latter has been found free, or the engaged signal if the latter is busy, or the indicative signal of the overflow equipment.

On the other hand, the pulses received by the recorder must also be transmitted to the recorder for charged communications which causes the electromagnets of the printing recorder to take a position corresponding to the number of the desired station.

Relay 3 of the recorder (Fig. 4) re-transmits the impulses which it receives from the calling station via:

Ground, t41, r32, contact 1 of the bank of the finder CE (Fig. 7), wiper 1, contact b of mixer X1 in position 4, the winding of relay 13 and the battery.

The first attraction of the relay 13 sets relay 14 to work via:

Ground, t131, the inductive winding, the resistance wound on relay 14 and the battery.

Relay 14 closes the holding circuit as follows:

Ground, t142, its two windings in series and the battery.

Relay 14 is short-circuited each time relay 13 falls back, but its period of delay is greater than the period during which the circuit which receives the impulses is open, so that relay 14 cannot fall back during the transmission of the train of pulses. It falls back only when the operator of the calling station uses his dial to transmit the next figure, during which period the relay 13 is at rest and short-circuits relay 14 for a sufficiently long time.

The circuit of the electromagnet of mixer X1 is closed via:

Ground, t141, contact a of mixer X1 in position 4, the winding of X1 and the battery.

The electromagnet X1 attracts its armature and remains in this position till the release of relay 14 which takes place at the end of the reception of the train of pulses which represents the figure to be received (here the figure 2).

The circuit of the element which prints the figure of the tens of thousands is closed as follows:

(Fig. 7), ground, t132, contact a of mixer X1 in position 4, wire 1, point 71 (Fig. 8) the winding of the electromagnet 3 and the battery.

At each emission of negative current by the dial of the calling station relay 3 of the recorder (Fig. 4) is released, and accordingly relay 13 of the recorder for charged communications is attracted; on the hand, relay 3 of the recorder is attracted at each emission of positive current which in turn releases relay 13 of the recorder for charged communications.

The circuit of the printing element 3 for the figure representing tens of thousands (Fig. 8) is, therefore, established at each emission of negative current and ceases at each emission of positive current. It follows from that the printing element 3 makes as many steps as there are units in the transmitted figure.

In the example chosen the printing element 3 brings the figure 2 of its wheel which is provided with printing characters, opposite the paper band.

Relay 14 of the recorder for charged communications (Fig. 7) is then short-circuited by the contact r131 for a long time, and exhausts its period of delay and falls back, thereby opening at t141 the attraction circuit of the electromagnet of mixer X1 which releases its armature and brings its wipers into position 5, thus disconnecting the printing element 3 and connecting the printing element 4 for the figure which represents thousands.

Contact r33 of electromagnet 3 (Fig. 8) is opened mechanically as soon as the electromagnet has left its rest position. On the other hand contact t32 is also established mechanically, but only when the electromagnet has left its rest position, and only till its return into this position.

The second figure is received on the printing electromagnet 4 in a manner identical to that described for the first figure, mixer X1 of the recorder for charged communications (Fig. 7) being in position 5 instead of 4.

The third, fourth and fifth figures are received by printing elements 5—6—7 (Fig. 8), mixer X1 of the recorder for charged communications successively occupying the positions 6, 7, 8.

After the reception of the last figure the printing elements of the printing recorder are in the following positions:

3 in position 2.
4 in position 5.
5 in position 8.
6 in position 8.
7 in position 1.

After the reception of the last figure mixer X1 of the recorder for charged communications (Fig. 7) passes into position 9, the attraction circuit of its electromagnet being open at t141.

In this position, printing of the number of the called station is effected.

Type wheels carrying printing characters are shown at 711, 712, 713, 714, 715, 716, 717. Holding contacts which are mechanically held in their position are shown at 32, 42, 52, 62, 72, 92, 33, 43, 53, 63, 73, 93.

The circuit of the electro-hammer of the printing recorder is closed as follows:

Ground, t84 (Fig. 7), contact a in position 9 of mixer XI, wiper IN of finder CE, contact IN (Fig. 8), the winding of the electromagnet 8 and the battery.

The electromagnet 8 attracts its armature and presses the paper band against the wheels of the printing electromagnets 3—4—5—6—7 which are equipped with printing characters.

Now the circuit of relay 12 of the recorder for charged communications (Fig. 7) is closed as follows:

Ground, t81, contact b of the mixer in position 9, the winding of relay 12, the resistance and the battery.

Relay 12 attracts tis armature and at t121, it closes the crossing circuit of the electromagnet of mixer X1 as follows:

Ground, t121, contact d of mixer X1 in position 9, the circuit-breaker, the winding of XI and the battery.

Mixer XI then brings its wipers into position 10, thereby interrupting, at 9, the circuit of the electro-hammer 9 of the printing recorder, which releases its armature.

In position 10 the circuit of the electromagnet for advancing the paper band is closed as follows:

Ground, $t84$, contact $a$ in position 10 of mixer XI, wiper $Ab$ of finder CEI, contact $Ab$ (Fig. 8), the winding of the electromagnet 13 and the battery.

Electromagnet 13 attracts its armature and advances the paper band. By its contact $t131$ it closes the circuit of the relay 2:

Ground, $t131$, the winding of 2 and the battery.

Relay 2 closes a holding circuit as follows:

Ground, $t27$, the winding of 2 and the battery.

Relay 2 then establishes a circuit for the return to rest of printing elements 3—4—5—6—7— via:

Ground, $t22$, T32, $r31$, the winding of 3 and the battery.

Ground, $t23$, T42, $r41$, the winding of 4 and the battery.

Ground, $t24$, T52, $r51$, the winding of 5 and the battery.

Ground, $t25$, T62, $r61$, the winding of 6 and the battery.

Ground, $t26$, T72, $r71$, the winding of 7 and the battery.

The vibrating elements now return to their rest position; in this position, contacts $t32$, $t42$, $t52$, $t62$ and $t72$ are open, and contacts $r33$, $r43$, $r53$, $r63$ and $r73$ are closed. When all the printing elements have returned to their rest positions, relay 2 is short-circuited by means of the following connections:

Ground, T27, $r33$, $r43$, $r53$, $r63$, $r73$, $r93$ and the winding of relay 2.

Then relay 2 falls back, and all the printing elements are ready to receive the number of the calling station.

It has been mentioned above that the wipers of electromagnet XI of the mixer have been brought to position 10. In this position, relay 12 is short-circuited by the following circuit:

Ground, $t81$, $t122$, contact $b$ of mixer XI in position 10 and relay 12.

Relay 12 then exhausts its period of delay and falls back thereby re-establishing its contact $r121$.

The circuit of relay 9 is similarly closed in this position as follows:

Ground, $t84$, contact $d$ of XI, in position 10, the upper winding of 9 and the battery.

Relay 9 closes a holding circuit as follows:

Ground, $t84$, $t92$, the lower winding of relay 9, wiper IP of the finder CEI, contact IP (Fig. 8), the winding of the printing electromagnet for position 10 and the battery.

The electromagnet 10 cannot start working because the resistance of the winding of relay 9 of the recorder for charged communications is too high to permit of its functioning.

The circuit of the combiner XI is closed as follows:

Ground, $r121$, contact $c$ of mixer XI in position 10, the circuit-breaker, the winding of XI and the battery.

Electromagnet XI then brings its wipers into position 11.

The recorder for charged communications then begins the search for the calling station. The first phase consists in the search for the call finder which is in engagement with the calling line. As the designation of this call finder it is sufficient to indicate the element representing hundreds to which this call finder is connected. The rotation circuit of finder RC of the recorder for charged communications is closed as follows:

The battery, $r123$, $r111$, $r101$, contact $h$ in position 11 of mixer XI, the circuit-breaker and the winding of the electromagnet RC to ground.

The finder RC begins to rotate automatically, and searches for the test plug to which a wire SC to which a wire SC, peculiar to each finder, is connected and which indicates to it that the wiper of the connection circuit is in engagement with the recorder.

The rotation circuit of electromagnet RC is opened as soon as wiper B of switch RC has reached this test plug. Then relay 11 of the recorder for charged communications (Fig. 7) begins to operate by means of the following connections:

(Fig. 6), the secondary of the transformer, rectifier RD1 or RD2 in the same direction as the current, point 23 (Fig. 4), $t72'$, $r111$, wiper S1 of the finder of the recorder, contact S1 of the bank (Fig. 3), the wiper and bank S of the finder of the connection circuit, wire Sc (Fig. 7), the bank and wiper $b$ of finder RC, contact $f$ of mixer XI in position 11, $t105$, the winding of relay 11, $r124$, $t13$, wiper S of the finder of recorder CE, the bank S (Fig. 4), $t116$, rectifier RD1 in the same direction as the current, $t72$, point 24 (Fig. 6), rectifiers RD3 or RD4 in the same direction as the current, and the secondary of transformer TF1.

Relay 11 opens the rotation circuit of finder CE at $r111$. At $t112$, it closes the attraction circuit of relay 12 by means of the following connections:

Ground, $t81$, $t112$, contact $b$ of the mixer in position 11, the winding of relay 11, the resistance and the battery.

Relay 12 closes a holding circuit by means of contact T122. It also closes the circuit of the electromagnet of mixer XI by means of the following connections:

Ground, $t121$, contact $i$ in position 11 of XI, the circuit-breaker, the winding of XI and the battery.

The electromagnet of XI then brings its wipers into position 12.

Relay 12 is then short-circuited by contact $b$ of mixer XI in position 12, and falls back.

Relay 11, the circuit of which is open (at contact $f11$ of the mixer XI), falls back in its turn.

The rotation circuit of finder RA is then closed via:

The battery, $r111$, $t101$, contact $h$ of mixer XI in position 12, the wiper and bank $c$ of finder RC, the circuit-breaker, the winding of RA, and the battery.

The finder RA begins to rotate automatically and searches for the test-plug to which a wire Sa peculiar to each subscriber is connected, and which indicates to it that wiper S of the connection circuit is in engagement with the recorder and that wiper S of the call finder is in engagement with the calling line. The rotation circuit of the electromagnet RA is opened as soon as wiper $a$ (or $b$, $c$, $d$, $e$, or $f$ according to the element representing the hundred to which the subscriber belongs) reaches this test-plug. The circuit of relay 11 of the recorder for charged communications (Fig. 7) is then closed as follows:

(Fig. 6), the secondary of the transformer, rectizers RD1 or RD2 in the same direction as the current, point 23 (Fig. 4), t72′, r111, wiper S1 of the finder of the recorder, contact S1 of the bank (Fig. 3), the wiper and bank S of the finder of the connection circuit, tC24, wiper S and bank S of the call finder, point Sa (Fig. 7), the bank and wiper A of finder RA, bank A and wiper A of finder RC, contact f of mixer X1 in position 12, t105 the winding of relay 11, r121, t103, wiper S of finder C.E., bank S (Fig. 4) t115, rectifier RD1 in the same direction as the current, t72, point 24 (Fig. 6), rectifiers RD3 or RD4 in the same direction as the current, and the secondary of TF1.

Relay 11 begins to operate, and at r111 it opens the rotation circuit of the electromagnet of X1.

The circuit of the electromagnet of mixer X1 is closed as follows:

Gronnd, t81, t112, contact i of mixer X1 in position 12, the circuit breaker, the winding of the electromagnet of X1 and the battery.

The electromagnet brings the wipers of mixer X1 into position 12. In this position relay 15 (Fig. 7) which had already begun to operate by means of the following connections:

t81, the winding of relay 15, contact i in position 9 of mixer X1, the resistance K and the battery, and which had closed a holding circuit by means of contact t152, closes (by its contact t151) the circuit of the electromagnet of mixer X1 as follows:

Ground, contact g of mixer X1 in position 13, r184, the winding of X1 and the battery.

But relay 15 is short-circuited by means of the following connections:

Ground, contact h of the mixer X1 in position 13, wiper a in the rest position of switch X2, t153, the winding of relay 15 t81 and ground.

Relay 15 then falls back, thereby opening at t151 the circuit of the electromagnet of the mixer X1 which brings its wipers into position 14.

The circuit of the reciprocating members of relays 16 and 17 is established as follows:

Ground, contact g of mixer X1 in position 14, r151, the winding of relay 16, resistance Z and the battery.

This brings the working contacts of relay 16 into position.

At t162 relay 16 closes the circuit of relay 17 which in its turn comes into operation, and at t171, it short-circuits relay 16 which falls back, thereby releasing relay 17. When relay 17 is again at rest position the relay 16 is released from its short-circuit at t171 and can again attract its contacts.

The combination of relays 16 and 17 thus forms a device comprising reciprocating relay members which operate at a rhythm established by their adjustment. At each attraction of relay 16 the circuit of the electromagnet of rotary switch X2 is closed by contact t163 and also the circuit which transmits pulses to the element which prints the characters representing tens of thousands, as follows:

(Fig. 7), ground, t161, r181, contact f of mixer X1 in position 14, wire 1, point 71 (Fig. 8), the winding of the printing electromagnet 3 and the battery.

Establishment of these circuits ceases at the falling back of relay 16. When wiper a of switch X2 encounters the test wire connected to contact i of mixer X1 in position 14 (in the chosen example) where the number of the calling subscriber is 21251, the test wire coming from coming from contact i is connected to plug 2 of wiper a of X2) the circuit of relay 13 is closed as follows:

The battery, resistance k, contact i of mixer X1 in position 14, test wire 2 which corresponds to contact 2 of sector a of switch X2, the winding of relay 15, t81 and ground.

Relay 15 begins to operate and closes a holding circuit by means of contact t152.

The attraction circuit of relay 16 is open at r151, and relays 16 and 17, accordingly, cease to operate. The printing element of the figure representing tens of thousands of the printing recorder therefore presents the figure 2 of its wheel equipped with printing characters towards the paper band to be printed.

Switch X2 therefore has a return circuit as follows:

Ground, t154, sector b, the circuit-breaker, the winding of the electromagnet of switch X2 and the battery.

When the wipers of the switch X2 arrive at the rest position the rotation circuit of X2 is open. The switch X2 therefore stops in this position.

The re-transmission (to the printing recorder) of the first figure of the calling subscriber being finished, the attraction circuit of the electromagnet of mixer X1 is then closed as follows:

Ground, contact g of mixer X1 in position 14, t151, r184 the winding of the electromagnet of X1 and the battery.

The electromagnet of X1 therefore attracts its armature.

But relay 15 is then short-circuited by means of the following connections:

Ground, contact h of mixer X1 in position 14, the rest position, sector A of switch X2, t153, the winding of relay 15, t81 and ground.

Relay 15 therefore falls back, thereby opening at t151 the circuit of the electromagnet of mixer X1 which brings its brushes into position 15, thus disconnecting at F14 the printing element of the figure representing tens of thousands and connecting at F15 the printing element of the figure of the printing recorder which represents thousands. The second figure is received on the printing electromagnet 4 of the printing recorder by a circuit identical to the circuit described for the re-transmission of the first figure, mixer X1 of the recorder for charged communications being on position 15 instead of 14.

Switch X2 advance step by step, controlled by the successive operation of 16 in the search for the test plug which wiper e of finder RC of the recorder for charged communications indicates to it.

When wiper A of switch X2 reaches this position, the attraction circuit of relay 15 is closed as follows:

The battery, resistance k, contact i of mixer X1 in position 15, wiper e of finder RC, the contact of the bank, test wire 1, sector a of switch X2, the winding of relay 15, t81 and ground.

Relay 15 then begins to operate and opens the attraction circuit of relay 16. Relays 16 and 17 cease to operate.

The return circuit of switch X2 is closed as follows:

Ground, t154, sector b, the circuit-breaker, the winding of X2 and the battery.

When wiper b of switch X2 reaches its rest position, switch X2 stops.

The attraction circuit of the electromagnet of mixer X1 is established as follows:

Ground, contact g of mixer X1 in position 15, t151, r184, the winding of X1 and the battery.

The electromagnet of X1 therefore attracts its armature.

When switch X2 has returned to its rest position the relay 15 is short-circuited via:

Ground, contact h of mixer X1 in position 15, rest position of wiper a of mixer X2, t153, the winding of 15, t81 and ground.

At t163 the circuit of relay 12 is closed as follows:

Ground, r171, t163, contact d in position 1 of mixer X6 r124, the winding of relay 12 and the battery.

Relay 12 is held by its operating contact t126, r231, or r243, T71' to ground.

At r121 the attraction circuit of relay 15 is open. Relay 15 therefore falls back and releases relays 13 and 14, the circuits of which are open at t151, t152 and t153. Relay 16 therefore also falls back, thereby opening at t163 the circuit of the electromagnet of the electromagnet of mixer X6 which brings its brushes into position 2. At t125 the engagement polarity is placed in wire T2 indicate that the connector is engaged, this having been tested by the first selector.

*Selection of figures in the "ten" group*

When, on the one hand, the input distributor X5 has left position 4, and when, on the other hand, mixer X6 has arrived in position 2, the selection of figures in the ten group can begin because, on the one hand, that figure will have been already received and recorded on the numerical element X4, and because, on the other hand, the first selector is connected to a free connector.

The rotation circuit of the connector is then closed as follows:

(Fig. 4), the battery, t76', wire 36 (Fig. 5), r151, contact a of mixer X6 in position 2, t122, wire 27 (Fig. 4), wiper B2 of the finder of the recorder, contact B2 (Fig. 3), the wiper and bank B of the first selector, rCO2, the circuit-breaker, the winding of the electromagnet RCO to ground.

The connector begins to rotate automatically in the search for the test plug which indicates to it that wiper c of numerical element X4 is in position 8.

(Fig. 4) the battery, t76, t151, r141, t134, contact a of mixer X6 in position 1, r122, wire 34, wiper Re of the finder of the recorder, contact R2 (Fig. 3), the circuit-breaker, the winding of the electromagnet RS1 to ground.

As contact T of the bank of the first selector passes by a positive polarity, relay 14 of the recorder (Fig. 5) is excited.

The brushes of the first selector stop in this position because the rotation circuit of the first selector is open at r141. Armature 141 of relay 14 places the upper winding of relay 13 (a winding of low resistance) in shunt with the winding of relay 14. The potential of the test plug therefore falls to a value near that of the negative pole of the battery. The connector is thus protected against any engagement possible by another first selector. Relay 13, being a differential relay, thereupon falls back, because the fluxes which its two windings produce in its magnetic circuit oppose each other exactly.

*Connection to the connector*

The end of free selection is marked by the following position of relay 15, 14 and 13, relays 14 and 15 in operation, and relay 13 at rest.

As soon as these relays occupy this position, relay 16 of the recorder (Fig. 5) is connected, via:

(Fig. 5), the battery, resistance, r131, t142, the winding of relay 16 to ground.

Relay 16 can only begin to operate if the following condition is fulfilled: the fourth figure has been transmitted, and distributor X5 is in position 5. In fact, relay 16 is short-circuited via:

(Fig. 4), ground, sector c of X5 in position 4, wire 49 (Fig. 5), contact g of mixer X6 in position 1, rest contact 216, the winding of relay 16 to ground, if the fourth figure is not yet recorded.

The crossing circuit of mixer X1 is then closed as follows:

Ground, t21, contact g of X1 in position 19, the circuit-breaker, the winding of the electromagnet of X1 and the battery.

The electromagnet of X1 then brings its brushes into position 20.

Mixer X1 of the recorder for charged communications does not leave this position until after having received the elements which indicate the position of the communication furnished to it by the recorder.

In the case of communications in transmit these indications are furnished to it by the connection circuit.

*Selection of the called station—selection of the first selector—controlled selection*

When the input distributor X4 has reached position 4, that is, when the three first figures have been received and recorded by the numerical elements representing tens of thousands and hundreds X1—X2—X3, the first controlled selection may start. Mixer X6 which till now has remained in the rest position, passes into position 1 by means of the following circuit:

Ground, T41, r51, sector c of X1 in position 2, sector d of X2 in position 5, sector d of X3 in position 8, contact h of mixer X6 in position 0, the circuit-breaker, the winding of the electromagnet and the battery.

Mixer X6 thus comes into position 1.

In this position of the mixer the rotation circuit of the first selector is closed as follows:

(Fig. 4), the battery, t76', wire 36 (Fig. 5), r151, contact a of mixer X6 in position 1, r122, wire 34 (Fig. 4), wiper R2 of the finder of recorder CE, contact R2 (Fig. 3), the circuit-breaker, the winding of RS1 and earth.

Selector RS1 rotates automatically until its wiper c encounters the test contact which indicates to it the numerical element X3 by means of its wiper c in position 8.

The rotation circuit of the electromagnet of selector RS1 is interrupted as soon as wiper c of the first selector reaches the test plug.

Relay 15 then functions by means of the following connections:

(Fig. 6), the secondary of the transformer, rectifiers RD1 or RD2 in the same direction as the current, point 23 (Fig. 4) t76, wire 32 (Fig. 5) r121, wire 29 (Fig. 4), wiper c2 of the finder of recorder CE, contact c2 (Fig. 3), wiper c of the first selector, the test wire, point 14 (Fig. 4), the bank c of numerical element X2 in position 5, wiper b of numerical element X1 in position 2, wire 1, the arrangement of wire 54 (Fig. 5), contact c of mixer X6 in position 1, r241, the two windings of relay 15 in series, wire 47 (Fig. 4) the rectifier RD2 in the same direction as the current, t72, point 24 (Fig. 6), the rectifiers RD3 or RD4 in the same direction as the current, and the secondary of the transformer TF1.

At r151 the controlled rotation circuit of selector RS1 is opened. By means of its contact t151 relay 15 prepares the closing of the free rotation circuit of the first selector.

The circuit of relay 13 is closed by means of contact t152 as follows:

(Fig. 4), ground, t71, wire 46 (Fig. 5), t152, contact c of mixer X6 in position 1, the lower winding of relay 13 and the battery.

This relay then begins to operate.

The end of the controlled section is thus indicated in the recorder by the following condition:

Relays 15 and 13 in operation, and mixer X6 in position 1.

Free selection

Controlled selection being finished, free selection then begins. The rotation of the wipers of the first selector then takes place, as follows:

The operating contacts are thus opened, and the electromagnet of mixer X1, the circuit of which is open at t151, falls back, thereby bringing the wipers of mixer X1 to position 15, disconnecting the printing element representing the figure of thousands and connecting the printing element representing the figure of the hundreds.

The third, fourth and fifth figures are received by the printing elements 5—6—7 (Fig. 8), whereby mixer X1 of the recorder for charged communications successively occupies positions 16—17—18 and the test wire is successively presented to switch X2 by wiper D of finder RC, then by wipers g and h of finder RA. After the reception of the last figure the printing elements of the printing recorder are in the following positions:

3 in position 2.
4 in position 1.
5 in position 2.
6 in position 5.
7 in position 1.

Mixer X1 of the recorder for charged communications is in position 19. In this position printing of the calling number is effected.

For this purpose, the circuit of the electromagnet-hammer of the printing recorder is closed as follows:

Ground, t84, contact f of mixer X1 in position 19, wiper Tn of the finder CE1, contact IN (Fig. 8), the winding of electromagnet 8 and the battery.

The electromagnet 8 therefore attracts its armature and prints the number of the calling station on the paper band.

The circuit of relay 12 of the recorder for charged communications (Fig. 8) is then closed as follows:

Ground, t81, contact b of mixer X1 in position 19, the winding of relay 12, the resistance y and the battery.

Relay 12 closes a holding circiut by means of its contact t122.

The rotation circuit of the connector is interrupted as soon as the testing brush of the connector reaches the test plug. Relay 15 of the recorder (Fig. 5) then operates by means of the following connections:

(Fig. 6), the secondary of the transformer, rectifiers RD1 or RD2 in the same direction as the current, point 23 (Fig. 4), t76, wire 32 (Fig. 5), t121, wire 33 (Fig. 4), wiper S2 of the finder of the recorder bank S2 (Fig. 3) the wiper and bank S2 of the first selector rCO4, the winding of relay CO and the resistance in shunt, the wiper and bank C, wire 15 (Fig. 4), sector C of the numerical element X4 in position 8, wire 2 of the wire assembly 54 (Fig. 5), contact e of mixer X6 in position 2, r241, the two windings of relay 15 in series, wire 47 (Fig. 4), the rectifier rd2 in the same direction as the current t72, point 24 (Fig. 6) rectifier RD3 or RD4 in the same direction as the current, and the secondary of transformer TF1.

At r151 the circuit of the rotating electromagnet of the connector is then opened.

The end of the selection of the figures in the ten group is marked in the recorder by the beginning of the operation of relay 15.

Movement of mixer X6 into position 3 (selector of the unit figures).

At t152 relay 15 prepares the movement of mixer X6 into position 3 for the selection of the units. This movement circuit is completed when the fifth figure has been received and recorded by numerical element X5. When that happens, wire 1 of X5 is engaged and relay 5 is released.

The mixer therefore moves into position 3 by means of the following connections:

Wire 56 (Fig. 4), ground, t71, t152, contact c of mixer X6 in position 2, r53, sector 1 of the numerical element X5, wire 52, (Fig. 5), the circuit-breaker and winding of the electromagnet X6 and the battery.

Thus, mixer X6 brings its brushes into position 3.

Selection of the units

When on the one hand, sector 1 is engaged and relay 5 is at rest and when, on the other hand, mixer X6 is in position 3, the selection of the units may begin because, on the one hand, the unit figure has been received and recorded on numerical element X5 and, on the other hand, the brushes of the connector are positioned on the element indicating "tens" to which the called station belongs.

The connector then begins another automatic rotation in the search for the test plug which wiper g of numerical element X5 of the units in position 1 indicates to it.

The rotation circuit of the electromagnet of the connector is opened as soon as wiper c of the connector reaches the test plug. The stopping relay 15 of the recorder then operates by means of the following connections:

The secondary of transformer TF1 (Fig. 6), rectifiers RD1 or RD2 in the same direction as the current, point 23 (Fig. 4), t76, wire 32 (Fig. 5), t121, wire 33 (Fig. 4), wiper S2 of the finder of the recorder, contact S2 (Fig. 3), wiper and bank S of the first selector, rCO4, the lower winding of CO and the resistance in shunt, wiper C and bank c of the connector, wire 16 (Fig. 4), sector g of numerical element X5 in position 1, wire 3, the wire assembly re (Fig. 5), contact e of mixer X6 in position 3, r241, the windings of relay 15 in series, wire 47 (Fig. 4), rectifier RD2 in the same direction as the current, t72, wire 24 (Fig. 6), rectifiers RD3 or RD4 in the same direction as the current, and the secondary of transformer TF1.

At r151, relay 15 interrupts the rotation circuit of the electromagnet of the connector.

Relay 13 then brings to operate by means of the following connections:

Ground, t71, t152, contact c of mixer X6 in position 3, the lower winding of relay 13 and the battery.

The end of the selection of the units is thus marked in the recorder by the following position of relays 15 and 13:

The two relays are in operating position. Relay 20 then begins to operate by means of the following connections:

Ground, t71, wire 46 (Fig. 5), t152, bank c of mixer X6 in position 3, t152, contact g of mixer X6 in position 3, the upper winding of 20 and the battery.

Relay 20 closes a holding circuit by means of its contacts t205 and t206, wire 46 (Fig. 4), t71 and ground.

*Testing of the called line*

At the moment when these two relays occupy this position, the testing of the called line is effected by the combination of relays 13 and 14, via:

The battery, the winding of relay 14, t153, contact b of mixer X6 in position 3, t123, wire 39 (Fig. 4), wiper A of the finder of the recorder, contact a (Fig. 3), the wiper and bank A of the first selector, rCO1, the wiper and bank T of the connector, wire T, the winding of the interrupting relay c and ground.

Two cases are then to be considered according as the called line is either free or engaged.

*The required line is engaged*

The potential of the test plug of the called station is near that of the negative pole of the battery.

Relay 14 of the recorder (Fig. 5) does not function.

The connector therefore begins to rotate again automatically in the search for a free line belonging to a group of lines associated with the same calling number.

If all these lines are engaged, the wipers of the connector pass beyond the group of the lines in question. The wiper c no longer closes the circuit of relay 15 of the recorder on the test wire 1 connected to position 1 of the numerical element X5 of the units.

Relay 15 is therefore released. Relay 13 continues in operation because of the following circuit:

t132, contact g of mixer X6 in position 3, t205, t206, wire 46 (Fig. 4), t71 to ground.

Relay 17 then begins to operate by means of the following connections:

(Fig. 4), ground, t71, wire 46 (Fig. 5), r152, t153, t204, the winding of relay 17 and the battery.

Relay 17 then closes a holding circuit at t173.

Synchronism of the cam bearing character OGC is then established, and relay 25 is energised by means of the cam connection via:

Ground, point 19 (Fig. 5), t174, the two windings of relay 25 in shunt and the battery.

During the rotation of the cam the circuit of the electromagnet of X6 is closed:

Ground, t252, t175, contact d of mixer X6 in position 3, the circuit-breaker, the winding of X6 and the battery.

The electromagnet therefore attracts its armature. On the interruption of the cam at point 19 (Fig. 5), relay 25 is released, thereby interrupting at t252 the circuit of the electromagnet of X6 which thereupon releases its armature. Mixer X6 brings its wipers into position 4. At the next rotation of the cam relay 25 is again attracted by means of the circuit above described.

At t252, the cam closes the circuit of the electromagnet of mixer X6 as follows:

Ground, t252, t175, contact e of mixer X6 in position 4, the winding of X6 and the battery.

When switch X2 arrives in position 2, relay 15 begins to operate by means of the following connections:

Ground, t81, the winding of relay 15, sector a of X2, wire 2, rest contact 191, t183, the resistance k and the battery.

The circuit of the hammer relays 16 and 17 is open at r151.

At t154, the return circuit of X2 to the rest position is closed as follows:

Ground, t154, sector b, the circuit-breaker, the winding of the electromagnet of X2 and the battery.

The positioning printing electromagnet will also have received two pulses and places figure 2 of the wheel with printing characters opposite the paper band. Relay 14 of the recorder for charged communications will have begun to operate at the first pulse received by relay 13 and will have been kept in operation by its contact t142 during the reception of the two engaged pulses.

The circuit of relay 5 is closed as follows:

Ground, t141, t96, the winding of 5 and the battery.

Relay 5 begins to operate and is held in operation by its contact t52.

After the reception of the second pulse, relay 14 is short-circuited for a long time by relay r131, and is released, thus short-circuiting relay 9 which is also released thereby indicating that the position signal has been properly received and re-transmitted to the printing recorder via:

Ground, r141, t54, t97, the winding of relay 9, t92, t84, to ground.

The positioning electromagnet of the printing recorder then begins to operate via:

Ground, r141, t54, t97, wiper IP of the finder CE1, contact IP (Fig. 8) electromagnet 10 and the battery.

The electromagnet 10 then attracts its armature and releases the printing device from its position on the paper band.

On the other hand, the wire for transmitting the characters O. C. C. is connected in brush at t251. This signal is sent to the calling station via:

Point 21 (Fig. 5), t251, contact f of mixer X6 in position 4, t172, wire 31 (Fig. 4), wiper A1 of the finder of the recorder, contact A1 (Fig. 3), the wiper and bank A of the finder of the connection circuit tC21, the wiper and bank A of the call finder, wire A, point 2 (Fig. 2), the resistance and winding of relay 1 in parallel, the winding of relay 3 to ground.

By means of its armature 31 and the contact t23 the signals are re-transmitted to the teleprinter.

On the other hand, relay 18 of the recorder for charged communications (Fig. 7) has begun to operate by means of the following connections:

Ground (Fig. 5), the resistance, t177, wire 57 (Fig. 4), t115, the bank and wiper D of the finder CE (Fig. 7) t94, t155, the winding of relays 18 and 19 in series, and the battery.

Only relay 18 begins to operate. At t186 it short-circuits the stopping relay 15, which is released. At t185 it sets the hammer relays 16 and 17 into operation.

Each beat of relay 16 corresponds to the transmission to the printing electromagnet of a pulse which indicates the position of the printing recorder by means of the following connections:

(Fig. 7), ground, T161, the winding of relay 13 and the battery.

These pulses are re-transmitted via:

Ground, t132, t92, wiper P of finder CE1, contact P (Fig. 8) the winding of relay 9 and the battery.

On the other hand, at each beat of relay 16 connector X2 rotates one step by means of the following connections:

t162, the winding of 16 and the battery.

On the other hand, after the transmission of the signal letter "O. C. C." to the calling station, relay 25 of the recorder (Fig. 5) is released, thereby opening at t252 the attraction circuit of the electromagnet of mixer X6 which brings its wiper into position 5.

The holding relay of the recorder, relay 4 (Fig. 4) is then short-circuited via:

Ground, t171, contact d of mixer X6 in position 5, the lower winding of relay 4 to ground.

At t43, relay 4 opens the holding circuit of the connection relay of calling line 7 which is released in its turn.

The maintenance of the relays of the call finder and of the opening elements is cut off at t73'.

The circuit of the connection relay of the first selector 12 is opened at t71, and is released, thereby interrupting at t125 the holding circuit on the side of the selector.

On the other hand, the circuit of relay 1 (Fig. 4) is open at t71, it also is released, thereby interrupting at t113 the excitation of the recorder for charged communications, the relay 10 of which falls back (Fig. 7), thereby releasing the holding relay 8.

The circuit of relay 1, which keeps the printing recorder (Fig. 8) in operation, is also interrupted.

All the elements of the central automatic station which have co-operated in the establishment of the communication are then released and become available again to service other calls.

The opening relay of line C (Fig. 3) having been released, re-establishes the resistance Cx at its contact C1, and a negative polarity is placed on wire A, point 2 (Fig. 2) the right hand winding of relay 1 to ground.

The relay, the fluxes of which are opposed to each other is released and short-circuits relay 2 for an appreciable period; this relay is also released by the following circuit:

The battery, t23, r11, the winding of 2 and the battery.

The release of relay 2 interrupts the telegraph line of the teleprinter at t23 and at t22. On the other hand, the supply voltage of the motor is interrupted at t23' and at t24'.

The motor stops and the operator of the calling station is thus informed that he is disconnected from the automatic elements.

*The called line is free*

When relay 14 of the recorder begins to operate (Fig. 5) the rotation circuit of the connector is opened at r141. By means of the armature 141, relay 14 shunts the upper winding of relay 13 (a winding of low resistance) to the winding of relay 14. The potential of the test plug therefore falls to a value near that of the negative pole of the battery.

The called line is thus protected against engagement by another connector.

Relay 13, which is a differential relay, is released, because the fluxes which its two windings produce oppose each other exactly. Relay 20 will have begun to operate, and is held in the manner previously described in the case of an engaged subscriber.

Relay 16 then begins to operate by means of the following connections:

The battery, resistance, r131, t142, the winding of relay 16 to ground.

The attraction circuit of the electromagnet of mixer X6 is closed, and operates via:

Ground, r171, t163, contact d of mixer X6 at a point 3, the winding of the electromagnet of X6 and the battery.

*Connection of the connector*

The end of the test of the called line is marked in the recorder by the following position of the relays 13, 14, 15 and 16. Relays 14, 15 and 16 are in operation, and relay 13 is at rest.

As soon as these relays occupy this position, the connection of the connector is effected. Relay CO (Fig. 3) of the connector begins to operate in series with relay 15 (Fig. 5), whose high resistance upper winding is short-circuited by contact t164.

Relay Co (Fig. 3) closes a holding circuit by means of its upper winding, tCO5, the bank and the wiper T of the first selector, bank and wiper T2 of the finder of the recorder (Fig. 4) t125, the resistance and the battery.

At tCO3 the interrupting relay of the called station is connected in branch with the test wire, and at tCO1 and TCO2, the line is connected to the calling station. Since the circuit of relay 15 of the recorder (Fig. 5) is open at rCO4 (Fig. 3), it is released. At t151 it opens the circuit of relay 14 which is also released, thereby releasing relay 16 which is open at t163. Mixer X6 brings its wipers into position 4. A positive polarity is then sent over wire A of the called station by means of the following connections, + resistance, t202, r176, contact b in position 4, wire 39 (Fig. 4), wiper A2 of the finder of the recorder, contact A2 (Fig. 3), the wiper and bank A of the first selector, tCO1, the wiper and bank A of the connector, wire A point 2 (Fig. 2), the resistance and winding of relay 1 in parallel, the winding of telegraphic relay 3 to ground.

Relay 3 lets its armature drop on the positive stop, thus closing the circuit of the holding relay 2, as follows:

+ armature 31, r23, the winding of 2 and the battery.

The circuit of the left hand winding of relay 1, is closed upon the establishment of contact X21, since the fluxes produced by its two windings are in the same direction, and relay 1 attracts its armature, thereby opening at r11 the release circuit of relay 2. The telegraphic circuit and the teleprinter are connected at t23 and t22'. The starting circuit of the motor is established at t23' and t24'.

The time when the motor starts (about 25) must be controlled by the recorder, lest any signal is sent before the teleprinter is in a condition to receive the signals. Switch X7 of the recorder (Fig. 5) establishes this control.

Relay 19 is short-circuited and is released by means of the following connections:

Ground, r171, r215, contact c of mixer X6 in position 4, sector a of switch X7 in the rest position, t193, the winding of relay 19, wire 46 (Fig. 4) t71 to ground.

The circuit, which advances switch X7 is closed at r192 as follows:

Ground, cam II of the pulse motor, t127, r192, the winding of X7 and the battery.

The cam of II starts switch X7 from its rest position into its movement into synchronism and then brings switch X7 into position 1.

Relay 19 then begins to operate via:

The battery, the resistance, contact a of mixer X6 in position 4, t208, r241', wire I of sector a of switch X7 in position 1, the winding of relay 19, t71 to ground.

The holding circuit of relay 19 is closed at t195.

The circuit which advances switch X7 step by step is then closed as follows:

Ground, cam I, t127, t192, r215', sector c then b, the winding of the electromagnet of 7 and the battery.

When the switch X7 arrives in position 10 of sector b, the circuit of the electromagnet of mixer X6 is closed as follows:

Ground, sector b of X7 in position 10, the winding of X6 and the battery.

Upon the cessation of the ground connection caused by the cam I, X7 clears position d10 and arrives at the rest position. Since the electromagnet of mixer X6 has its circuit open at b10, it releases its armature and brings its wipers into position 5.

The synchronous movement of the cam "letter D" is then secured via:

The ground connection of the cam (not illustrated in the drawing), point 20 (Fig. 5), t203, r174, the parallel windings of relay 25 and the battery.

During the rotation of the cam, or of a part of this cam, relay 25 begins to operate.

On the other hand, the two windings of relay 22 in this position are traversed by current, and the relay begins to operate, thereby completing at t221 the attraction circuit of the electromagnet of mixer X6, as follows:

Ground, t252, r183, r211', t221, r213', contact 2 of mixer X6 in position 5, the winding of the electromagnet X6 and the battery.

The electromagnet X6 attracts its armature, at the end of the passage of the cam (letter "D"), relay 25 is released, and at t252 it opens the attraction circuit of the electromagnet of X6 which releases its armature and brings its wipers into position 6.

When this synchronous movement has been completed the signal (letter "D") is sent to the called station via:

Signal, point 20 (Fig. 5), t251, contact b of mixer X6 in position 6, wire 39 (Fig. 4), wiper A2 of the finder of the recorder, contact A2 (Fig. 3), the wiper and bank A of the first selector, rCO1, the wiper and bank A of the connector, wire 2, point 2 (Fig. 2), the left hand winding of relay I and the resistance in parallel, the winding of the telegraphic relay 3 to ground.

By means of its armature 31 and t23 relay 3 repeats the signal received on the receiving element of teleprinter R. During the transmission of this signal, relay 25 is again in operation and closes at t252 the attraction circuit of the electromagnet of mixer X6 as follows:

Ground, t252, contact e in position 6 of mixer X6, the winding of the electromagnet and the battery; the electromagnet therefore begins to operate.

At the end of the transmission, relay 25 is released, thereby opening, on the one hand, at t251 the circuit for transmitting the signal, and on the other hand at t252, the circuit which causes attraction of the electromagnet of mixer 6; the latter releases its armature, thereby bringing its wipers into position 7.

Relay 18 which, in position 6 of mixer X6 has begun to operate, via:

Ground, t71, t206, the winding of relay 18, contact d of mixer X6 in position 6, the resistance and the battery, is held by its contact t182.

The left hand winding of relay 22 is connected in branch and in series to the transmission wire in the desired direction towards the caller.

(Fig. 2), ground, relay 3 for re-transmission, the resistance and right hand winding of relay I in parallel, wire 2 (Fig. 3), wire A, the bank and wiper of the call finder, tC21, the bank and wiper A of the finder of the connecting circuit contact A of the bank of the finder of the recorder, wiper A (Fig. 4), wire 31 (Fig. 5), r172, t201, contact a of mixer X6 in position 7, t207, the resistance and left hand winding of relay 22 in parallel, wire 27 (Fig. 4), wiper B2 of the finder of the recorder, contact B2 (Fig. 3), the wiper and bank B of the first selector, tCO1, the wiper and bank B of the connector, wire B, point I (Fig. 2), t22', the rest contact of dial C, the rest contact of the release button L, and the positive stop of the transmitter.

Upon the transmission of the first signal composing the call-sign, relay 22, the left hand winding of which is traversed by an inverse operating telegraph current, is released, thus marking the beginning of the transmission of the call-sign of the called station.

The circuit of the electromagnet of mixer X6 is then closed via:

Ground, t183, r211', r221, contact e of mixer X6 in position 7, the winding of the electromagnet and the battery.

The electromagnet is therefore put into operation.

At the end of the transmission of the first signal, relay 22, the left hand winding of which is now traversed by a telegraphic stand-by current, begins to operate, thereby opening at r221, the attraction circuit of electromagnet X6, which releases its armature, thus bringing its wipers into position 8. The end of the transmission of the call-sign of the called station is controlled in this position by the release of relay 18. Between each transmission of the signals composing the required call-sign, relay 22 comes into operating position, as has already been described above.

Relay 18 is then short-circuited by means of the following connections:

Ground, t183, r211', t221', r213', contact d of mixer X6 in position 8, the winding of relay 18, t206, t71 and ground.

Relay 18 has a time lag longer than the duration of the short-circuiting caused by the passage of a signal. It is released only at the end of the transmission of the signals composing the call-sign because it is then short-circuited for a sufficiently long time. The release which marks the end of the transmission of the call-sign of the called station prepares at r184 the driving circuit of mixer X6.

When the signal-cipher "D" has been sent to the calling station, synchronisation is effected. Relay 25 begins to operate upon the passage or part of the passage of the cam controlling the cipher "D" by means of a circuit already described several times. The attraction circuit of the electromagnet of mixer X6 is then closed as follows:

Ground, t252, r184, contact e of mixer X6 in position 8, the winding of the electromagnet of X6 and the battery.

The electromagnet is therefore put into operation. Upon the completion of the movement of this control cam, relay 25 is released, thereby opening at t252 the circuit of the electromagnet of X6 which releases its armature and brings its wipers into position 9.

Upon the following movement of the cam controlling cipher "D," relay 25 begins to operate again, thereby closing at t251 the circuit for transmission to the calling station, as follows:

Signal, point 21 (Fig. 5) t251, contact f of mixer X6 in position 9, t201, r172, wire 31 (Fig. 4) wiper A1 of the finder of the recorder, contact A1 (Fig. 3) the wiper and bank A of the finder of the connection circuit, tC21, the wiper and bank A of the call finder, wire A, point 2 (Fig. 2), the resistance and winding of relay 1 in parallel, the winding of relay 3 to ground.

Relay 3 repeats the signals by means of the following connections:

The negative terminal, armature 31, t25 and the windings of the receiving relay of the teleprinter to ground.

At the end of the transmission relay 25 is released, thereby opening at t52 the attraction circuit of the electromagnet of mixer X6 which releases its armature and brings its wipers into position 10.

*Connection*

After the transmission of the signal cipher "D" to the caller, the connection of the connection circuit is established, as follows:

(Fig. 5), ground, r171, contact a of mixer X6 in position 0, wire 28 (Fig. 4), t74, wiper CO of the finder of the recorder, contact CO (Fig. 3), the lower winding of relay 2 and the battery.

On the other hand, this ground connection is also directed to the recorder for charged communications by means of t112, bank L of the finder of the recorder for charged communications, contact L (Fig. 7), t106, the lower winding of relay 6 and the battery.

The relay 4 of the recorder is therefore short-circuited via:

Ground, contact d of mixer X6 in position 10, and the lower winding of relay 4 to ground.

The time lag of relay 4 having been exhausted, it is released, thereby opening at t43 the circuit of relay 7 which is released in its turn.

Mixer X6 moves into the rest position via:

Ground, r71, r211, contact h of mixer X6 in position 10, the circuit-breaker, the winding of the electromagnet and the battery.

Mixer X6 therefore brings its wipers into the rest position.

The recorder is thus entirely released.

Relay 2 of the connection circuit (Fig. 3) establishes at t71 and t22, the connection of the wires of lines A and B.

At t24 it closes a holding circuit.

At t24' and t22' it connects the test wires on the sides of both the connector and the finder side to the battery across resistance S.

At t21' the engagement of the circuit of connection is indicated on the banks of the finders of the recorders.

At r23' the excitation circuit is open.

At t23 the local windings of relays 1 and 3 are under tension.

The second winding of relay 1 and relay 3 are in series on each wire of the line on which they are fed, via:

(Fig. 2), ground, the windings of relay 3, the resistance and winding of relay 1 in parallel, wire 2 (Fig. 3), wire A, the bank and wiper of the call finder, tC21, the bank and wiper of the finder of the connection circuit, the resistance and the left hand winding of relay 1, t22, the wiper and bank B of selector tCO2, the wiper and bank B of the connector, wire B, point 1 (Fig. 2), t22, the rest terminal of dial C, the rest terminal of the releasing key, and the positive stop of the transmitter.

The same applies to the relay 3, the right hand winding of which is however in series with the other wire.

The two windings of relays 1 and 3 which are relays with a shunted magnetic field, are supplied with current, since the flux which their two windings produce in their magnetic circuit have the same direction; the two relays 1 and 3 therefore attract their armatures, thus opening at r31 and r11 the release circuit of the holding relay 2.

It has been noted that relay 6 of the recorder for charged communications (Fig. 7) has begun to operate at the same time as relay 2 of the connection circuit at the time when the recorder establishes the connection.

The circuit which prints the time when the communication begins is consequently closed via:

Ground, t81, t122, t62, r91, contact i in position 20 of switch X1 wiper Ih of the finder CE1 contact Ih (Fig. 8), the winding of electromagnet 12 and the battery.

Electromagnet 12 attracts its armature and releases the time-printing mechanism.

Relay 12 of the recorder for charged communications is then short-circuited via:

Ground, t81, t122, t62, r91, contact g of mixer X1 in position 20, the winding of relay 12, t81 to ground.

Relay 12 exhausts its period of delay and is released, thus establishing at r121 the circuit for rotating mixer X1 as follows:

Ground, r121, contact h of mixer X1 in position 20, the circuit-breaker, the winding of the electromagnet of X1 and the battery.

The mixer therefore brings its brushes into position 21.

The circuit for printing the time is open at i-20, and the circuit for advancing the paper band is closed via:

Ground, t84, contact f of mixer X1 in position 21, wiper Ab of finder CE1, contact Ab (Fig. 8), the winding of electromagnet 13 and the battery.

The electromagnet 13 then attracts its armature and releases the mechanism for advancing the band.

On the other hand, the circuit connecting the printing recorder to the connection circuit is established via:

(Fig. 7), ground, t84, contacts h and g of mixer X1 in position 21, wiper Co of finder CE1, contact Co (Fig. 8), the winding of relay 15 and the battery.

But the relay which holds the recorder for charged communications is short-circuited via:

Ground, t81, contact i of mixer X1 in position 21, the winding of relay 8, t82, t72 to ground.

Relay 8 exhausts its period of delay and re-establishes its rest contacts.

Relay 6, the circuit of which is open at t81, is released in its turn, thereby causing the release of relay 7 whose circuit is open at t63.

The circuit for rotating mixer X1 is closed via:

Ground, r81, contact j of mixer X1 in position 21, the circuit-breaker, the winding of X1 and the battery.

Mixer X1 then brings its brushes into the rest position.

The recorder for charged communications is entirely released.

Relay 15 of the printing recorder (Fig. 8), after having been put into operation by the recorder for charged communications, closes a holding circuit via:

The battery, the winding of relay 15, t152, wiper M of the finder of the printing recorder, bank M (Fig. 3), t23 to ground.

Relay 14 begins to operate by means of the following connections:

t151, the winding of relay 14 and the battery. At r141 the test circuit of the printing recorder is open on the bank of the recorders for charged communications.

The printing recorder remains connected to the connection circuit up to the time when the latter is released.

*Release of a communication*

The operator of one of the two stations in communication pushes the release button, thereby causing the emission of an operating current over wire 1, via:

(Fig. 2) the negative pole of the battery, the resistance, the operating contact of button L, the rest element of the contact of dial C, t22', wire 1 (Fig. 3), wire B, bank and wiper B of the call finder, tC22, bank and wiper B of the finder of the connection circuit, t21, the resistance and right hand winding of relay 3 in parallel, wiper and bank A of the first selector, tCO1, wiper and bank A of the connector, wire A, point 2 (Fig. 2), the resistance and winding of relay 1 in parallel, the winding of relay 3 to ground. The contact 21X (Fig. 2) connected to terminal 411 is closed before all the other contacts of relay 2.

Relay 1, the two windings of which are traversed by a current of opposite directions, is released, thereby establishing its rest contact r11.

Relay 2 is short-circuited for an appreciable period via:

The battery, t23, r11, the winding of relay 2 and the battery, and is released, thereby opening at X21 its holding circuit at t23' and t24', the feeding circuit of the motor is opened, and the motor stops, thus indicating to the operator that his caller has finished.

At t22' a permanent negative battery is placed on the wire 1 thus causing the release of the corresponding station, via:

Negative battery, the resistance, the rest contact of the call button, r22', wire 1 (Fig. 3) wire B, bank and wiper B of the connector tCO1, bank and wiper B of the first selector, t22, the resistance and left hand winding of relay 1, wiper and bank A of the finder of the connection circuit tC21, wiper and bank A of call finder, wire A, point 2 (Fig. 2), the resistance and right hand winding of relay 1, the windings of relay 3 to ground.

Relay 1, the two windings of which are traversed by a current of opposite directions, is released, thereby re-establishing its rest contact 11.

Relay 2, which is short-circuited for a long time by means of the connections:

The battery, t23, r11, the winding of relay 2 and the battery is released, thereby opening at X21 its holding circuit, and at X21' the circuit which feeds the local winding of relay 1.

At t23' and t24' the motor-supply circuit is opened. The motor therefore stops, thus indicating to the operator sending the final signal that he may cease operation of the release button. A negative current is sent over wire 1 via:

The negative pole of the battery, the resistance, the rest contact of the call button, r22', and wire 1.

Relays 1 and 3 of the connection circuit, the windings of which are traversed by currents of opposite directions, are also released, thereby short-circuiting relay 2 for a long time via:

Ground, r11, r31, the winding of 2 to ground.

Relay 2 exhausts its period of delay and is released, thereby opening at t24' and t23' the holding circuit of the elements which have contributed to the establishment of the communication and which is released. At t23 the circuit maintaining the printing recorder (Fig. 8) is interrupted. Relay 15 is released, but relay 14 is still held because of its delay. The circuit of the printing electromagnet 12 is again established via:

Ground, r151, t142, the winding of relay 12 and the battery.

Relay 12 attracts its armature and releases the mechanism which prints the time when the communication ends.

Relay 14, having exhausted its period of delay, is released thereby causing the release of electromagnet 12.

The printing recorder is released, and the ground connection indicating that the device is again free, is re-established at the rest element 141.

All the devices which have participated in the establishment of the communication are thus released and can serve other calls.

Figure 9A:
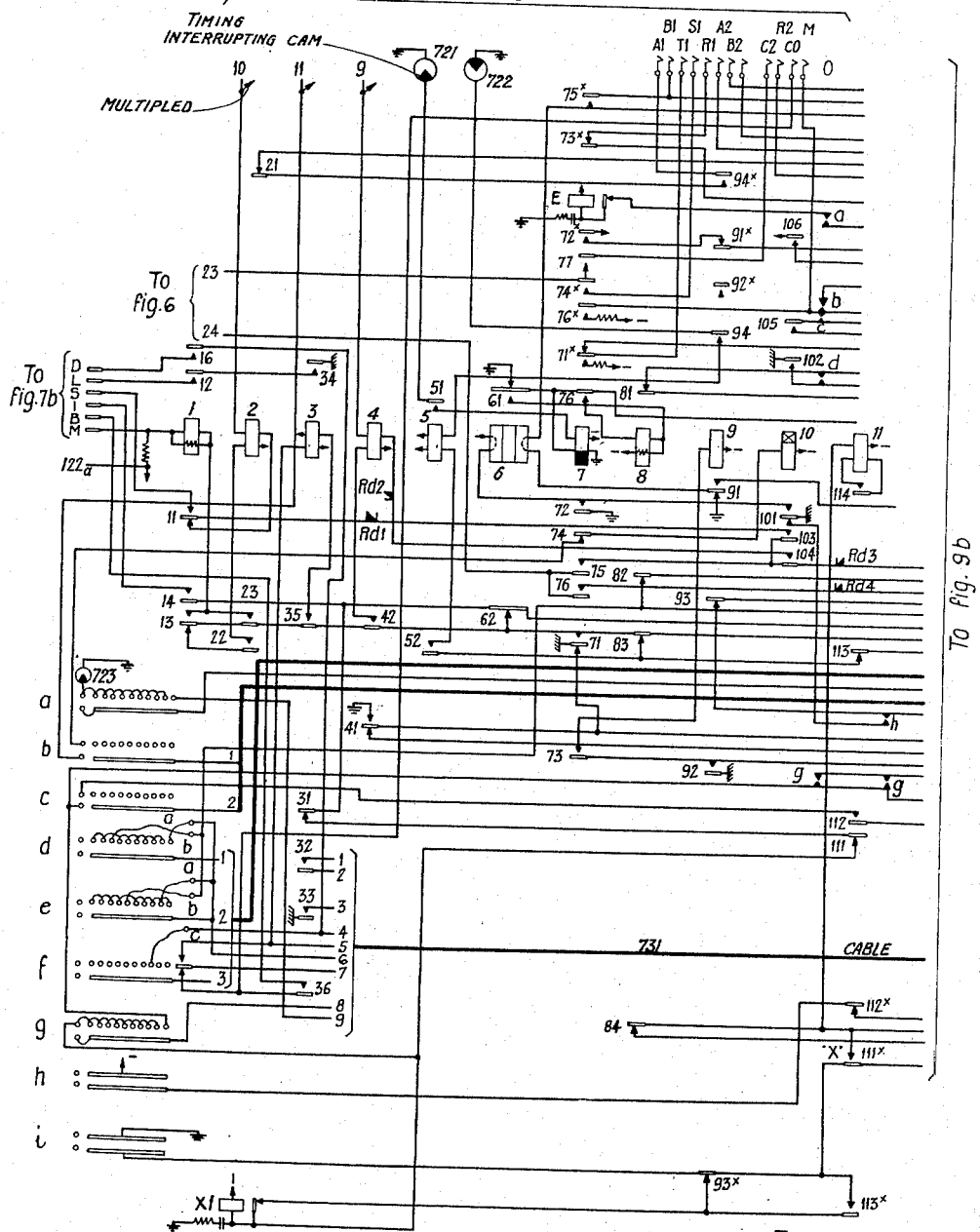
Figures 9a and 9b show a discriminating recorder.
Figure 9B:
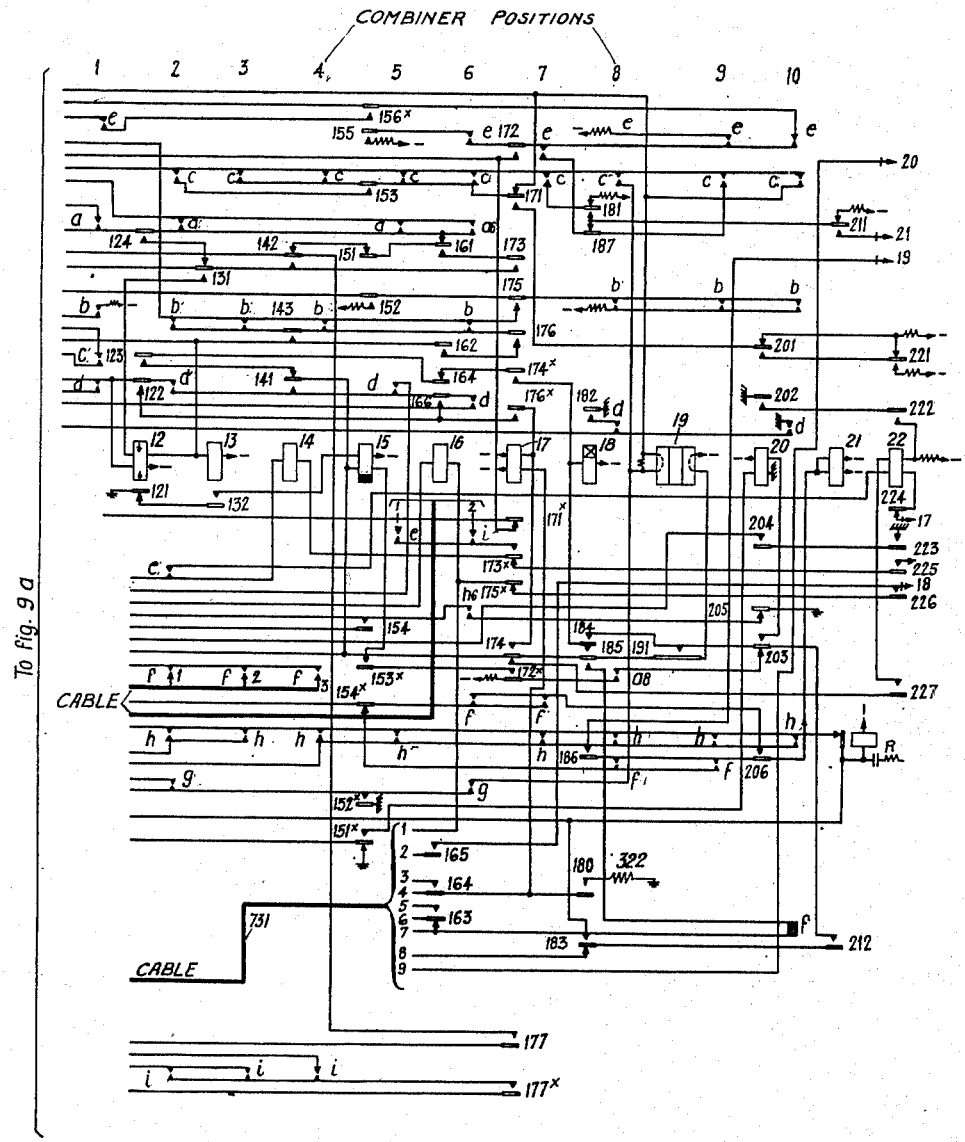

The operation of a discriminating recorder, illustrated in Fig. 9 will now be considered. This device replaces the recorder in exchanges where the traffic is to a great extent bound for a neighbouring exchange centre, called a dispatch exchange.

When a station is calling, point 1 is connected to a preparatory ground connection by tMC12 (Fig. 3).

Relay 10 of the discriminator then begins to operate via:

Ground, point 11, sector b of switch X1 in the rest position, r74, the winding of relay 10 and the battery.

Relay 10 in operation causes the excitation of relay 13 via:

Ground, t102, contact d of mixer R in position 0, the lower winding of relay 12 and the battery.

Finder E begins an automatic rotation in search for a free connection circuit, the contact M of which has a positive polarity. Its rotation circuit is closed via:

The battery, t106, r131, t124, contact a of mixer R in position 0, the circuit-breaker, the winding of electromagnet E to ground.

The rotation circuit of switch E will be opened upon the closing of a stopping circuit, as soon as wiper M passes over a contact corresponding to a free connection circuit.

Relay 13 is energised by means of the following connections:

Ground, the test resistance (Fig. 3), wiper M (Fig. 9), contact c of mixer R in position 0, t105, the winding of relay 13 and the battery.

The rotation circuit of finder E is opened at t131.

At t131, relay 13 places the upper winding of relay 12, a low resistance winding, in shunt with the winding of relay 13. The potential of the test-plug M consequently falls to a value near that of the negative pole of the battery. The connection circuit is thus protected against any possible engagement with another discriminator.

Relay 12 which is a differential relay, is released, because the fluxes produced by its two windings are exactly opposed.

Relay 13 in operation and relay 12 at rest characterise the engagement of a free member.

The circuit of relay 15 is then closed, via:

Ground, r121, t132, the upper winding of relay 15 and the battery.

Relay 15 begins to work. At r151 it establishes the opening of the rotation circuit of finder E. At t152, it places a polarity indicative of engagement of the element on wire M via:

The battery, the resistance, t152, contact b of mixer R in position 0, and wiper M.

But this resistance is connected to wire M in shunt with the unit formed by relays 12 and 13; relay 13 is therefore shunted, and relay 12 is excited, thereby interrupting at r121 the attraction circuit of relay 15 which exhausts its period of delay and is released.

The electromagnet of mixer R operates, when relay 15 begins to operate via:

Ground, t152, contact g of mixer R in position 0, the winding of the electromagnet and the battery.

Since its attraction circuit is open at t172, it releases its armature and brings its wipers into position 1.

The engagement polarity is now applied to wire M over contact b of mixer R in position 1, the resistance and the battery.

The rotation circuit of the call finder of the connection circuit is then closed, via:

The battery, t106, t124, contact a of mixer R in position 1, r13', wiper R1 of the finder of the recorder, the electromagnet of the call finder (Fig. 3), and the battery.

The call finder then begins an automatic rotation in search for the calling line. Relay 13 then operates, via:

The stopping ground connection of the line relay, the test wire, brush T1 of the finder of the recorder, r71', contact c of mixer R in position 1, t135, the winding of relay 13 and the battery.

The rotation circuit of the call finder is opened at r131. At t131, the upper winding of relay 12 is connected in shunt with the winding of relay 13. The test potential is thus reduced to a value near that of the negative pole of the battery. The line of the station is thus protected against any possible engagement by another call finder.

Relay 12, which is a differential relay, is released because the fluxes produced by its windings are exactly opposed. Relay 12 at rest, relay 13 in operation, and mixer R in position 1 characterise the engagement of the calling line. Then the circuit of relay 15 is closed, via:

Ground, r121, t132, the upper winding of relay 15 and the battery.

Relay 15 then begins to operate and at t152' it closes the attraction circuit of the electromagnet of mixer R via:

Ground, t152, contact g of mixer R in position 1, the winding of the electromagnet and the battery.

On the one hand, the left hand winding of the relay 6 is fed via:

Ground, t101, the left hand winding and the battery.

On the other hand, its winding is connected to wire B of the finder of the connection circuit in the direction of the calling station, via:

Earth, r91, the right hand winding of relay 6, contact e of mixer R in position 1, t156', wiper B1 and positive terminal of the battery at the control-box of the calling station.

The two windings of relay 6, which is a relay with a shunted field, are traversed by current in an appropriate direction; it therefore attracts its armature.

At t61, it closes the attraction circuit of relay 7 via:

Ground, the lower winding of relay 7, t61, the resistance wound on relay 8 and the battery.

The relay 7 therefore begins to operate.

At t77', it places a holding polarity on the test wire on the side of the call finder.

At t72 it establishes the circuit of the left hand winding of relay 6.

If the calling subscriber is a private subscriber:

Relay 2 begins to operate, via: the secondary of the transformer (Fig. 6), rectifier RD1 or RD2, point 23, t74, wiper S of the finder of the recorder, wires of the connection circuit, point 10, the upper winding of relay 2, r11, rectifier RD1 in the same direction as the current, t103, t75, point 24 and rectifier RD3 or RD4. It closes a holding circuit by means of t22, r11, t71 to ground.

At r74 it opens the circuit of relay 10 which exhausts its period of delay and is released.

Relay 13, the circuit of which is open at T105, is released thereby opening at t132 the attraction circuit of relay 15 which exhausts its period of delay and is also released.

The circuit of the electromagnet of R is opened at t152'; it releases its armature and brings its wipers into position 2.

The rotation circuit of the connector is closed via:

The battery, t72', r91', r142', r151, r161, contact a of mixer R in position 2, wiper R2 of the finder of the recorder, the circuit-breaker, and the winding of the electromagnet of the connector to ground.

The connector begins an automatic rotation in search for the first position of the bank; when wiper c of the connector reaches this position, relay 22 is energised via:

(Fig. 6) the secondary of the transformer, rectifier RD1 or RD2, point 23, t77, wiper c2 of the finder of the recorder, wiper and bank C of the connector, point 17, the lower winding of 22, contact e of mixer R in position 2, rectifier RD3, t75, point 24 (Fig. 6), rectifier RD3 or RD4 and the secondary.

Relay 22 closes a holding circuit via:

Ground, t71, r174, t227, the upper winding of relay 22 and the battery.

The connector continues its rotation and its wiper c encounters the test wire of the outgoing lines. Relay 14 then begins to operate via:

(Fig. 6) the secondary, transformer TF, rectifier RD1, point 25, t77, wiper C2 of the finder of the recorder, wiper and bank c of the connector, t225, r173', the winding of relay 14, rectifier RD3, t75, point 24.

The rotation circuit of the connector is opened at r141, and at t143 the test relay 13 is connected to wire T2, via:

The battery, the winding of relay 13, t143, contact b of mixer R in position 2, wiper T2 of the finder of the recorder.

Differential relay 12 is put into operation via:

Ground, t71, t141, contact D of mixer R in position 2, the lower winding of relay 12 and the battery.

The rotation circuit of the connector is again closed via:

The battery, $t72'$, $r97'$, $t142$, $r131$, $t124$, contact A of mixer R in position 2, wiper R2 of the finder of the connecting recorder.

The connector begins its uncontrolled selection in the search for a disengaged outgoing line, characterised by a resistive ground connection to a test wire.

Upon the passage of wiper T of the connector over a free line, relay 13 of the discriminator begins to operate via:

The battery, the winding of relay 13, $t143$, contact $b$ of mixer R in position 2, wiper T2 of the finder of the recorder to ground in the test of the free line.

At $r131$ the rotation circuit of the connector is opened, and the wipers of the connector are stopped on the tested line.

Armature 131 places the upper winding of relay 12 (a low resistance winding) in shunt with the winding of relay 13. The potential of the test plug falls consequently to a value near that of the negative pole of the battery.

The outgoing line is thus protected against any possible engagement by another connector.

Relay 12, which is a differential relay, is released, because the fluxes which its two windings produce in its magnetic circuit are exactly opposed.

The attraction circuit of relay 15 is closed, via:

Ground, $r121$, $t132$, the upper winding of relay 15 and the battery.

Relay 15 then begins to operate.

At $r151$ it establishes the opening of the rotation circuit of the connector.

It closes the circuit of relay 9 at $t152'$, via:

Ground, $t152'$, contact $g$ of mixer in position 2, $t73$, the winding of relay 9 and the battery.

Relay 9 then begins to operate, and closes a holding circuit at $t92$.

The control wire of the calling station is extended towards the line relay of the distant office, via:

Wire B of the calling subscriber, wiper B1 of the finder of the recorder, $t75$, the right hand winding of relay 6, $t91$, $r171$, wiper A2 of the finder of the discriminator, wire A and the call relay of the circuit in the distant office.

Relay 6 is held in operating position.

The circuit signalling the reply of the calling station is prepared at $t94'$.

Relay 2, since the start of its operation, has closed the circuit which puts the recorder for charged communications into operation, via:

Ground, $t71$, $t23$, the windings of relay 1 in parallel, the resistance and point 22.

The stopping polarity is likewise imparted to bank M of finder CE of the recorder for charged communications. When the wipers of the finder CE arrive at the calling discriminator, relay 1 begins to operate via:

Ground, $t71$, $t23$, the windings in parallel of relay 1, bank M and the battery in the recorder for charged communications.

At $t13$, it closes a holding circuit.

At $r13$, it opens the holding circuit of relay 2 which is released.

At $t11$, $t12$, $t14$, $t16$, it connects the control wires between the recorder and the recorder for charged communications.

By its release, relay 2 closes the line circuit to the calling station via:

Wire B the line to the distant office, wiper B2 of the finder of the discriminator, $r171$, $r153$, contact $c$ of mixer R in position 2, $r21$, $t94'$, wiper A1 of the finder of the discriminator and the calling station.

When the elements of the distant office are positioned, they control the start of the motor of the calling operator.

The operator of the calling station then composes on his dial the number of the called station, say 25831.

The numbering impulses are, on the one hand, received in the recorder of the distant office, and on the other hand, by the discriminator, the relay 6 of which is in series with the control wire between the distant station and the distant office.

At each emission of negative current, relay 6 is released.

The first release of the relay 6 sets up the operation of relay 8, via:

Ground, $r61$, $t76'$, the inductive winding of relay 8, the resistance and the battery.

Relay 8 is short-circuited at each attraction of relay 6, but it consequently acquires delay longer than the duration of a closing impulse, so that relay 8 cannot fall back during the sending of a sequence of impulses composing a figure; it falls back only when the operator of the calling station operates his dial for the transmission of the following figure.

The circuit of the electromagnet receiving the impulses is closed, via:

Ground, $t71$, $r62$, $r31$, $r111$, the winding of the electromagnet X1 and the battery.

Upon each emission of negative current by the dial of the calling station, relay 3 is released. This relay is, on the contrary, attracted at each emission of positive current. The circuit of the receiver element X1 is, consequently, established at emission of negative current and ceases at each emission of positive current. Therefrom it follows that the receiver element X1 makes as many steps as there are units in the transmitted figure.

In the chosen example, the element X1 makes 2 steps and brings its wipers into position 2.

Relay 8, being short-circuited for a long time, exhausts its period of delay and is released. The attraction circuit of relay 11 is then closed, via:

Ground, $t71$, $r83$, $r113$, contact $f$ of mixer R in position 2, wire 1, sector B of the numerical element X1 in position 2, point $b$, the upper winding of relay 11 and the battery.

Relay 11 closes a holding circuit, via:

Ground, sector 1, X111', the winding of 11 and the battery.

The return circuit to rest of element X1 is closed, via:

Ground, sector $i$, $t113'$, the circuit-breaker, the winding of electromagnet X1 and the battery; and switch X1 brings its wipers into the rest position. In this position the attraction circuit of the electromagnet of mixer R is closed, via:

Ground, $r151'$, $t112$, sector $e$ of receiver element X1 in the rest position, the winding of electromagnet R and the battery.

The electromagnet of mixer R therefore attracts its armature.

The circuit of relay 11 is opened at sector $i$ of X1, it exhausts the delay which its lower winding, short-circuited at $t114$, produces, and is released, thereby opening at $t112$ the attraction circuit of the electromagnet of mixer R which releases its armature and brings its wipers into position 3, thereby disconnecting at F2 sector "D" of the numerical element X1 which served for the discrimination of the direction when this can be indicated at the first figure, and connecting at 3 the sector "E" of numerical element X1 which serves for the discrimination of the direction when this direction can be indicated at the second figure.

The reception of the second figure brings the receiver element X1 into position 5; in this position the return circuit to rest position is established in a manner identical to that described for the reception of the first figure. Mixer R moves into position 4, disconnecting at F4 sector F of element X1. This sector serves for discriminating the direction when this is indicated by the third figure. The reception of the third figure brings the receiver element into position 8 which is the number of the hundred allotted to the local stations.

Relay 8 which is short-circuited for a long time at T61 exhausts its period of delay and is released, thereby closing the excitation circuit of local relay 17, via:

Ground, t71, r83, r113, contact f of mixer R in position 4, wire 3, sector f of element X1 in position 8, point c, wire 4, the strand of wires, wire 4, the lower winding of relay 17 and the battery.

Relay 17 closes a holding circuit, via:

Ground, t71, t174, the upper winding of 17 and the battery.

Relay 11 then begins to operate via:

Ground, sector i of element X1 out of rest position, t177, contact i, the upper winding of relay 11 and the battery.

Relay 11 closes a holding circuit by means of its contact X111'.

The return circuit to rest of receiving element X1 is then closed, via:

Ground, sector i, t113', the circuit-breaker, the electromagnet of X1 and the battery.

The receiving element X1 brings its wipers into the rest position.

The attraction circuit of the electromagnet of mixer R is closed via:

Ground, r151', t112, sector c of X1 in the rest position, the winding of electromagnet R and the battery.

The electromagnet then commences operation. The circuit of relay 11 is open at sector i of X1, it exhausts the delay imparted to it by its lower winding which is short-circuited at t114, and is released, thereby opening at t112 the circuit of the electromagnet of R which brings its wipers into position 5.

The test circuit of the connector is open at sector b4. The line to the distant exchange is then released.

*Selection of the figures representing tens*

The fourth figure, or figure representing "tens" is composed by the operator of the calling station, and is received by the receiver element X1 in a manner identical with the three first figures.

As soon as the brushes of the receiver element have left their rest position the electromagnet for the rotation of the connector is included in the circuit via:

The battery, sector h, which is short-circuited, r112', t177, r142, r151, r161, contact a of mixer R in position 5, wiper R2 of the finder of the discriminator, the electromagnet for the rotation of the connector, to ground.

The wipers of the connector move in the search for the test wire which indicates to them the present position of wiper B of element X1. At the end of the reception of the figure of the "tens," wiper A of element X1 is in position 8.

Figure 6:
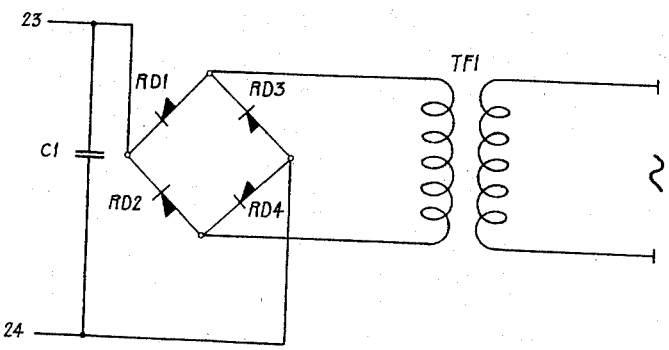

When wiper c of the connector meets the test contact which wiper B of the receiver element X1 indicates to it, relay 14 is energised by means of the following connections:

(Fig. 6) the secondary of the transformer, rectifiers RD1 or RD2 in the same direction as the current, point 23 (Fig. 9), t77, wiper C2 of the finder of the discriminator, wiper C of the connector, the test wire, sector b of the element X1 in position 8, wire 1, contact e of mixer R in position 5, t173', the winding of relay 14, rectifier RD3, t75, and point 24 (Fig. 6).

At r142 the rotation circuit of the connector is open. Ground, t71, t141, contact d of mixer R in position 5, r82, the upper winding of 11 and the battery.

Relay 11 closes a holding circuit via:

Ground, sector i of element X1 out of its rest position, contact X111', the upper winding of relay 11 and the battery.

The return circuit of the electromagnet of X1 is closed via:

Ground, sector 1 of element X1 out of its rest position, t113', the circuit breaker, the winding of the electromagnet for the rotation of X1 and the battery.

Electromagnet X1 brings its wipers into the rest position.

The attraction circuit of the electromagnet of mixer R is then closed via:

Ground, r151', t112, sector c of element X1 in the rest position, the winding of the electromagnet of R and the battery.

The electromagnet of mixer R therefore attracts its armature.

Relay 11, whose holding circuit has been open at sector 1 of X1 exhausts its delay imparted to it by its lower winding, which is short-circuited at t114, and is released, thereby opening its contact t112; the electromagnet of mixer X1 releases its armature and brings its wiper into position 6. The reception of the fifth figure or figure of the units brings the element X1 into position 1.

The electromagnet for the rotation of the connector is switched in, when the brushes of the receiver element X1 have left their rest position via:

Battery, sector h, which is short-circuited, r112', t177, r142, r151, r161, contact a of mixer R in position 6, wiper R2 of the finder of the discriminator, the electromagnet for the rotation of the connector, to ground.

The wipers of the connector move in search of the test wire which the wiper c of element X1 in position 1 indicates to them.

When wiper c of the connector reaches this test contact, relay 14 is energised, via:

(Fig. 6) the secondary, rectifier RD1 or RD2, point 23 (Fig. 5), t77, wiper C2 of the finder of the discriminator, wiper and bank c of the connector, the test wire connected to contact 1 of sector c of element X1, wire 2, contact i of mixer R in position 6, t173, the winding of relay 14, rectifier RD3, t75, point 24 (Fig. 6), RD1 or RD4 and the secondary of the transformer.

At r142 the rotation circuit of the connector is open.

At r141 the attraction circuit of relay 12 is closed, via:

Ground, t71, t141, contact d of mixer R in position 6, r81, the lower winding of relay 8 and the battery.

The end of the selection of the units is thus marked in the discriminator by the position of relays 14 and 12. These two relays are in operating position.

*Testing of the called line*

At the moment when these two relays occupy this position the testing of the called line is effected by the groups of relays 12 and 13 via:

The battery, the winding of relay 13, *t*143, contact *b* of the mixer in position 6, wiper T of the finder of the discriminator, the winding of the opening relay to ground.

Two cases are, then, to be considered according as the called line is either engaged or free.

*The called line is engaged*

The potential of the test contact of the first line of the called station is near that of the negative pole of the battery.

Relay 13 of the discriminator therefore does not function.

The connector again rotates automatically in search for a free line belonging to the group of lines grouped under the same call number, via:

The battery, sector *h*, *r*112′, *t*177, *t*142, *r*131, *t*124, contact *a* of mixer R in position 6, wiper R2 of the finder of the discriminator, the electromagnet for the rotation of the connector, to ground.

If all the lines are engaged, the wipers of the connector pass beyond the group of lines in question. Wiper *c* ceases to close the circuit of relay 14 on test wire *f* which is connected to the position 1 of wiper *c* of the receiving element X1.

Relay 14 is therefore released, but relay 12 maintains itself in operation because it finds a holding circuit via:

Ground, *t*71, *t*174, *t*176′, *t*122, the lower winding of relay 12 and the battery.

Then relay 18 begins to operate via:

Ground, *t*71, *r*141, *t*123, *r*164, *t*174′, the winding of relay 18 and the battery.

Relay 18 closes a holding circuit via:

Ground, *t*71, *t*185, the winding of relay 18 and the battery.

The synchronisation of the cam "letter OCC" is then effected.

Relay 21 is energised on the passage or on a part of the passage of the cam, which covers the transmission of the "letter OCC," via:

Ground, point 19, *t*186, the winding of relay 21 in parallel and the battery.

During the passage of the cam the circuit of the electromagnet of mixer R is closed via:

Ground, *t*71, *r*141, *t*123, *r*164, *t*174′, *t*184, *t*212, *t*183, the winding of the electromagnet and the battery.

The electromagnet of R attracts its armature. On the interruption of the cam at point 19, relay 21 is released, thereby opening at T212 the circuit of electromagnet R which releases its armature. Mixer R therefore brings its wipers into the position 7.

At the following passage of the cam, relay 21 is again attracted by means of the circuit before described.

At *t*212 it closes the circuit of the electromagnet of mixer R which then begins to operate. The wire for the emission of the signal characters "OCC" is connected in shunt at *t*211.

This signal is therefore sent to the calling station via:

The signal source, *t*211, *t*181, contact *c* of mixer R in position 7, *r*21, *t*94′, wiper A of the finder of the discriminator, and the receiver element of the calling station.

On the other hand, the recorder for charged communications which is in engagement with the recorder, has recorded the number of the called station, and the trains of pulses constituting this number are sent over the numbering relay of the recorder for charged communications via:

Ground, *t*71, *r*62, *t*14, and contact I of the bank of the finder of the recorder for charged communications.

When relay 18 of the discriminator is energised, a resistive ground connection is placed on wire D, via:

Ground, the resistance wire 4, *t*16, contact D of the bank of the finder, of the recorder for charged communications (Fig. 7) and the position of the communication is thus recorded by the printing recorder.

After the transmission of the signal character "OCC" to the calling station, relay 21 of the discriminator (Fig. 9) is released, and it opens at contact *t*212, the attraction circuit of the electromagnet of mixer R which brings its wipers into position 8.

The holding relay of the discriminator is short-circuited, via:

Ground *t*182, contact *d* of mixer R in position 8, and the lower winding of relay 7 to ground.

The holding circuit of the line relays of the calling station is opened at contact 71′.

Contact *t*71 opens the common ground, so that the holding of the recorder for charged communications is also opened.

Mixer R therefore comes to the rest position, via:

Ground, *r*71, *r*41, contact *h* in positions 8, 9, 10, the circuit-breaker, the winding of electromagnet R and the battery.

All the elements which have contributed to the establishment of the communication are thus released and become again available for serving other calls.

*The called line is free*

Relay 13 of the discriminator begins to operate, thereby opening at *r*131 the rotation circuit of the connector. Armature 131 connects the upper winding of relay 12 (which is a winding of low resistance) in shunt with the winding of relay 13. The potential of the test plug of the called station drops, consequently, to a value near that of the negative pole of the battery.

The called line is thus protected against any possible engagement by another connector.

Relay 12, which is a differential relay, is released because the fluxes which its two windings produce in its magnetic circuit, are exactly opposed.

Then the circuit of relay 15 is closed, via:

Ground, *r*121, *t*132, the upper winding of relay 15 and the battery.

Relay 15 closes a holding circuit, via:

Ground, *t*71, the lower winding of relay 15, *t*153′, *t*172, the resistance and the battery.

Then relay 11 begins to operate, via:

Ground, *r*205, contact *h* of mixer R in position 6, *t*154, the upper winding of 11 and the battery.

Relay 11 is held in operation, and causes switch X1 to return to the rest position, as has already been explained previously.

A positive current is sent over wire A of the called station, via:

The positive pole of the battery, the resistance, *t*155′, contact *e* of mixer R in position 6, *t*172, wiper A2 of the finder of the discriminator and the calling station.

When the elements of the control-box of the called station have come into operating position, a positive current is sent over wire B.

Relay 19, the right hand winding of which is fed with supply current via:

Ground, t71, the right hand winding and the battery, also has its left hand winding fed with supply current via:

The positive terminal of the battery, wire B (not shown in the diagram), wiper B2 of the finder of the discriminator, the resistance and the left hand winding of relay 19 in parallel, contact g of mixer R in position 6, t152' to ground.

Relay 19 is therefore energised, because its two windings are traversed by currents of appropriate directions.

On the other hand, relay 21 moves with the rhythm of a cam to which it is connected, as follows:

Ground, the cam, sector a of switch X1, contact f of mixer R in position 6, t206, the windings of relay 21 and the battery.

When relay 21 is energised, the circuit for advancing the electromagnet of the mixer is closed via:

Ground, t71, t191, t212, r183, wire 8, sector g of X1, the winding of the electromagnet of X1 and the battery.

The switch begins its controlled rotation, thereby also controlling the time when the motor of the teleprinter starts.

When switch X1 arrives at position 10, the circuit for advancing the cam is opened, and X1 stops in this position.

The synchronisation of cam cipher "D" is then secured via:

The ground connection of the cam, point 20, wire 9, sector a of X1 in position 10, contact f of mixer R in position 6, t206, the winding of relay 21 and the battery.

During the passage of the cam or of a part of this cam, relay 21 begins to operate, thereby completing the attraction circuit of the electromagnet of mixer R, via:

Ground, t191, t212, r183, wire 8, sector g of X1 in position 10, the winding of electromagnet R and the battery.

Electromagnet R attracts its armature at the end of the passage of the cam, and relay 21 is released, thereby opening at t212 the attraction circuit of the electromagnet of R which brings its wipers into position 7.

The synchronisation being secured, the signal cipher "D" is sent to the called station, via:

The signal source, point 21, t211, r181, contact e of mixer R in position 7, t172, wiper A2 of the finder of the discriminator, to the called station.

Similarly, the electromagnet of R is again operated via:

Ground, t71, t191, t212, r183, wire 8, sector g of X1 in position 0, the winding of electromagnet R and the battery.

Electromagnet of R therefore attracts its armature.

At the end of the passage of the cam cipher "D," relay 21 is released, opening at t212 the attraction circuit of the electromagnet of R which brings its wipers into position 8.

The left hand winding of relay 19 is connected in branch but in series with the transmitting wire in the desired direction towards the caller, via:

Wiper b2 of the finder of the discriminator, the resistance and left hand winding of relay 19, contact c of mixer R in position 8, r21, t94' and wiper A1.

At the first signal forming the indicative sign, relay 19 is released, and opens at its contact t191, the holding circuit of relay 20 which is released in its turn, thereby preparing at r203 the short-circuiting of relay 15. After the emission of the last signal composing the indicative sign of the called station, relay 19 again begins to operate, thereby completing at t191 the short-circuit of relay 15 which, being short-circuited for a sufficiently long time, is also released.

Ground, t71, t191, r203, contact a of mixer R in position 8, ground at 172, t153, the lower winding of relay 15 to ground at t71.

The circuit effecting the synchronisation of the signal character "D" is then closed, via:

The cam, point 19, wire 9, sector a of X1 in position 10, r154', contact f of mixer R in position 9, the winding of relay 21 and the battery.

As soon as the cam passes, relay 21 begins to operate and the attraction circuit of mixer R is then closed, via:

Ground, t71, t191, t212, r183, wire 8, sector g of element X1 in position 10, the winding of the electromagnet and the battery.

At the end of the passage of the control cam, relay 21 is released, thereby opening at its contact t212 the attraction circuit of the electromagnet of R which brings its wipers into position 9.

Upon the passage of the following cam, relay 21 is again energized, thereby establishing at its contact 211 the circuit for transmitting the signal cipher "D" to the calling station, via:

The signal source, point 21, t211, r187, contact c of mixer R in position 9, r21, t94', wiper A1 of the finder of the discriminator, and the calling station.

The electromagnet of mixer R, the circuit of which is closed by contact t212 and a circuit previously described, attracts its armature.

At the end of the transmission of the signal, relay 21 is released, thereby opening at its contact t212 the attraction circuit of electromagnet R which brings its wipers into position 10.

The transmission wires of the telegraphic channel are connected to each other at contacts e and c of mixer R in position 10.

The attraction circuit of relay 3 is closed, via:

Ground, t71, r185, contact f of mixer R in position 10, wire 7, t15, the lower winding of 3 and the battery.

Relay 3 closes a holding circuit by means of its contact T35.

At t34 it causes the recorder for charged communications to proceed with the printing of the time when the communication begins, then with the connection of the connection circuit.

Wire Co is then grounded via:

Contact b of the finder of the recorder for charged communications, t36 and wiper Co of the finder of the discriminator.

The connection of the connection circuit is thus effected.

The circuit of the right hand winding of relay 6 in the connection circuit is opened and the relay is released.

At contact 71, the common ground is interrupted.

The holding circuit of the recorder for charged communications is interrupted at point M.

The rotation circuit of mixer R in position 0 is established via:

Ground, r71, r41, contact h of mixer R in position 10, the circuit-breaker, the electromagnet of R and the battery.

Switch X1 also moves to the rest position via:

Ground, sector i of X1 out of its rest position, r93', the circuit-breaker, the winding of the electromagnet of X1 and the battery.

The discriminator is therefore released.

*The communication is intended for a distant exchange*

It may be assumed that discrimination may be effected at the first figure, the 5 for instance.

After the reception of the first figure in a manner already explained previously, receiving element X1 is in position 5. Relay 3 then begins to operate and closes a holding circuit at T35.

By its contact t34, t12 and wire L it indicates at the recorder for charged communications that the connection circuit must be connected upon the reception of the 5 figures representing the number of the called station.

At its rest contact r31 it opens the circuit for transmitting the numbering pulses to the receiver element X1.

The pulses composing each figure of the number of the called station are sent to the recorder for charged communications only.

As soon as the recorder for charged communications has received the five ciphers forming the figure of the called station and the search for the number of the caller has been effected, it performs the connection of the connection circuit.

The circuit of the right hand winding of relay 6 is opened at the rest contact 21 of relay 2 of the connection circuit. It is released, and at r61 short-circuits the holding relay 8 which is also released, thus releasing the discriminator, as has already been previously explained.

*Return over the local overflow equipment*

When a station is calling, the connector of the connection circuit in engagement with that line is directed to an outgoing line, if no line is free, and the connector, in following that rotation, is stopped on the control wire of the overflow equipment, via:

(Fig. 6) the secondary of the transformer, rectifiers RD1 or RD2, point 23 (Fig. 9), wiper C2 of the finder of the discriminator, wiper C of the connector, the control wire, point 18, t226, r175, the winding of relay 16, rectifier RD4, t76, point 24 (Fig. 6), rectifier RD3 or RD4 and the secondary of transformer TF1.

At contact r161, the rotation circuit of the connector is opened.

It will not yet have proceeded to test line.

Two cases are then to be considered.

The communication is either destined locally or the communication is intended for a distant office.

(a) The communication is destined locally.

The reception of the figure representing hundreds (8 for instance) determines that the communication is intended for a station connected to the local automatic switch.

Relay 17 is energised by the circuit already explained in the case of a local communication, and closes a holding circuit at contact t175.

It opens at rest contact 175' the energising circuit of relay 16 which is released. Then relay 11 begins to operate via:

Ground, sector 1 of the receiver element X1 out of its rest position, t177', contact i of mixer R in position 4, the upper winding of relay 11 and the battery.

Relay 11 closes a holding circuit at its contact X111', and at contact t113' it closes the return circuit into the rest position of the receiver element X1. Contact X111' closes before all the other contacts of relay 11. Mixer R clears position 4 and brings its wipers to position 6, via:

Ground, r151, t112', sector c of element X1 in the rest position, the winding of the electromagnet of mixer R, and the battery. In this position the selection of the figure representing tens is then effected.

The same conditions prevail as in the case of a call of a local subscriber already described previously.

(b) The communication is intended for a distant station.

The direction to be attained is determined after the reception of either one or two figures, as soon as this direction has been determined, relay 3 begins to operate, its energising circuit being closed, via:

The battery, the lower winding of relay 3, t15, wire 7, t163, wire 6, contact a, sector d or e of element X1 according as the direction has been determined by the first or second figure, wire 1 or 2, contact f1 or f2 of mixer R in position 2 or 3, r113, r83 and t71.

Relay 3 closes a holding circuit by means of its contact t35.

Relay 16 which has determined the stopping of the connector on the control wire of the return lines to the overflow equipment, has a holding circuit closed, via:

The control wire, point 18, t165, wire 2, t32, wire 1, the winding of 16, rectifier RD4, t75 and point 24.

Relay 17 is then brought into operating position via:

Ground, t33, wire 3, t164 and the lower winding of relay 17 to ground.

Relay 17 closes a holding circuit by means of its contact t174.

The pulse circuit to the receiver element X1 is opened at contact r31, and the following pulses are received by the recorder for charged communications only.

The circuit energising relay 12 is closed via:

Ground, t71, t174, t176, t166, contact d of mixer R in position 2, r81, the lower winding of relay 12 and the battery.

The circuit of the electromagnet for rotating the connector is again closed, via:

The battery, t72', r91, r142, r151, t161, t173, r131, t124, contact a of mixer R in position 2, wiper R2 of the finder of the discriminator, the electromagnet of the connector and the battery.

The connector starts in the search for a free line of the overflow equipment, which is characterised by a resistive ground connection to test wire. Upon passage over this line, relay 13 is energised via: wiper T2 of the finder of the discriminator, contact b of mixer R in position 2, t176, t162, the winding of relay 13 and the battery. The circuit of the electromagnet for the rotation of the connector is opened at contact r131. Armature 131 connects the upper winding of relay 12 (a winding of weak resistance) in shunt with the winding of relay 13.

The potential of the test plug of the line to the overflow equipment falls, consequently, to a value near that of the potential of the negative pole of the battery. The line of the overflow battery is thus protected against any possible engagement by another connector.

Relay 12, which is a differential relay, is released, because tthe fluxes produced by its windings oppose each other exactly.

Then relay 15 begins to operate, via:

Ground, r121, t132, the upper winding of 15 and the battery, thereby closing the circuit energising relay 9, via:

Ground, t152′, contact g in position 2 of mixer R, t13, the winding of relay 9 and the battery.

Relay 9 closes a holding circuit at t92. The completion of these operations is identical with that already explained in the case of a call from a local station. The overflow line and the local station are operated in an identical manner.

The re-transmission over the overflow equipment is indicated in the recorder for charged communications by means of the folowing circuit:

Ground, t33, wire 3, t164, wire 4, t24, and contact d of the bank of the finder of the recorder for charged communications.

Fig. 10 illustrates the connection of the control wires where a secondary connector is employed.

Switches X4 and X5 illustrated in this figure relate to the recorder already described and shown in Figs. 4 and 5.

It may be assumed that the number of lines allotted to the figures 6 and 7 in the "tens" is sufficiently great and necessitates the addition of a secondary connector to the bank to which these lines are connected.

Numerical element X4 is in position 4. The electromagnet of connector 1 moves its wipers in the search for the test plug which wiper C of numerical element 4 in position 6 indicates to it.

When wiper c of connector 1 meets this contact, the circuit of the stopping relay in the recorder, wire S, connector 1, rCO14, the resistance and lower winding of CO1 in parallel, wiper C, the control wire, rectifier Rd1, wiper c of element X4 in position 6, and the supply circuit of the stopping relay.

Figure 5B:
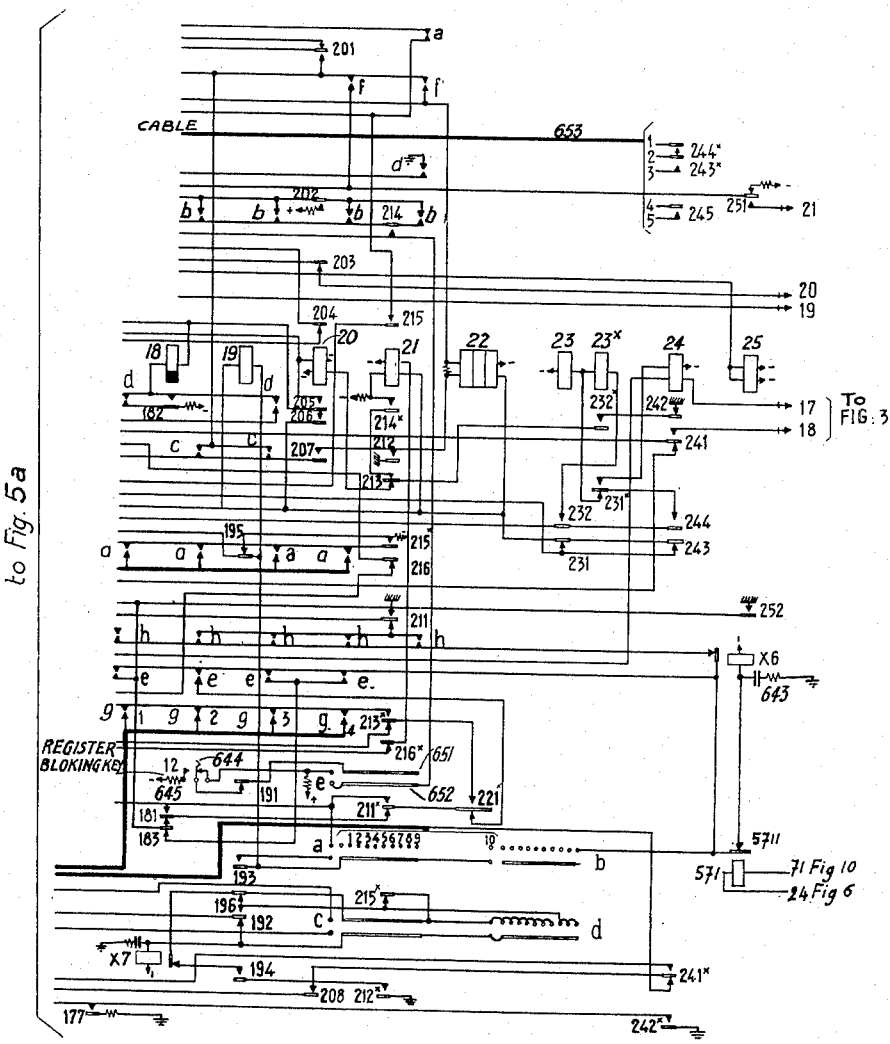

Rectifier RD3 and wire 71 are connected in branch in shunt with the circuit, and wire 71 is connected to one end of the winding of relay shown at 571 in Fig. 5b, the other end of this winding being connected to the terminal 24 (Fig. 6) of the insulated battery. The rest contact 5711 of relay 571 is connected to the end of the winding of the power magnet X6 of the sequence switch which is not earthed. When current passes through wire 71, contact 5711 is opened, and current no longer passes through the winding of electromagnet X6, which is thus stopped in its position. Thus, the sequence switch remains in the same position for the tens digit and for the units digit and testing is effected for both digits on the same control wire, first on connector 1 and then on a free connector 2.

Relay CO1 of the connector 1 establishes the connection and extends all the control wires to the tested secondary connector.

The electromagnet of secondary connector 2 rotates its wipers in search for the control wire which wiper c of numerical element X4 in position 6 indicates to it.

When wiper c of connector C2 reaches this contact, the stopping relay of the recorder is energised by means of a circuit already described several times.

The secondary connector is therefore stopped.

The recorder then moves in the selection of the units; it is assumed that the figure of the units is the figure 2.

The secondary connector 2 again rotates automatically in the search for the test plug which the sector g of numerical element X5 in position 2 allots to it. It then selects a free line in the group of lines belonging to the figure ending in figure 6 of the "tens" and figure 2 of the units.

It is to be noted that control wires 6 and 7 are extended to a common point, but across rectifiers on the bank of connector 1; they therefore shunt connector 1 to the same group of secondary connectors 2; on the other hand they operate separately on the normal connector 3.

Fig. 11 shows three traffic exchanges connected with each other in pairs.

When all direct connections between the two traffic exchanges are found engaged, the use of a detour by means of a third traffic exchange may be tried. If a connection between A and C is available, this connection is effected, but if all the connections AB and AC are engaged, the overflow is effected at A. If a connection AC is free and if all the connections CB are busy, the overflow is effected at C.

The device illustrated in Fig. 12 is a route changing device which may be situated at point C for instance.

Relay 0 is a busy relay intended for any given direction. It is normally attracted when the lines in the same direction are free. It is in the rest position, if all the lines are engeged.

The relays 1, 2, 3 are appropriated to each recorder; they determine:

Relay 1—that the line is an incoming line, and comes from a traffic exchange.

Relay 2—that the line is a simple incoming line coming from a collecting exchange.

Relay 3—that the local calling station is a private station.

The numerical element X1 of the recorder may be supposed to be in position 7.

If a call coming from traffic exchange A in a direction towards traffic exchange B finds no position free in the direction AB, is diverted in the direction of C, from which point it can reach exchange B. This call therefore ends across the wipers of a call finder A. B. T. S. point 2, towards a free recorder.

Relay 1 of the recorder is in operation, thereby indicating that the call comes from a traffic exchange.

The recorder directs wipers A1, B1, T1, S1 and C1, from point 3 of a first selector towards the corresponding level in the direction C—B.

Then two cases are to be considered:

It is either possible to operate in the direction C—B, or

All lines in the direction C—B are engaged.

(a) Assuming that relay 0 is in operation, then the wipers of the selector are directed to the control contact Z which selector A of numerical element X1 in position 7 indicates to it across the operating contact 01.

The establishment of the communication then follows its normal course in the direction C—B.

(b) On the second hypothesis, relay 0 will be at rest. The return relay to the overflow equipment of exchange C is then operated by the following circuit:

Ground, RC2, sector b of numerical element X1 in position 7, t11, and point 1, the return relay of the recorder not being shown in the diagram. No other de-routing is permissible.

It is evident that if the call which ends at point C had been sent from an exchange other than a traffic exchange, for instance, from a collecting exchange, relay 1 would not be in operating position, and the de-routing might then have been effected by means of another traffic exchange. The problem is the same as that already explained above.

If the lines between the traffic exchanges C and B are all busy, then detour means of a third exchange F has to be made, the only restriction being that the call ending at the point C does not already come from another traffic exchange.

I claim:

1. In an automatic switching system for a telecommunication exchange; a plurality of calling lines; a plurality of called lines; a plurality of recorders; in each recorder one of the two portions of a finder the contact of whose two portions establishes an electrical connection, a battery having no point in common with the battery of any other recorder, a numerical element, a connection between the wiper of said numerical element and one pole of said battery and a connection between said portion of said finder and the other pole of said battery; a plurality of connection circuits for connecting any calling line with any called line; in each of said connection circuits, the second portion of said finder, so that any link circuit may be connected to any recorder over a finder; a plurality of selectors each of which comprises a row of control terminals and a control wiper capable of hunting over said terminals; a connection between the second portion of each finder and the control wiper of a selector over the connection circuit to which belongs said second portion; a plurality of control wires each of which is multipled at one end on a terminal of the numerical element of each recorder and at its other end on a control terminal of each selector; and means for moving said wiper of said selector which is connected to a recorder over a connection circuit until closure of an electrical control circuit passing through the battery of said recorder.

2. A system according to claim 1, in which each selector comprises a row of test terminals over which hunts a wiper having constantly the same orientation as the control wiper, each test terminal is inserted in a test circuit, the electrical control circuit comprises the winding of a relay placed in the recorder, and a contact of said relay is inserted in the test circuit and closes said test circuit when said relay is energized.

3. A system according to claim 1, in which the control wire divides at its second mentioned end into two branches, each of which is multipled on one different control terminal of each selector, and means allow of cutting either one or the other of said two branches.

4. A system according to claim 3, in which said means consists of a busy relay whose energization is controlled by the busy condition of the line corresponding to the control terminal on which is multipled one of said two branches.

5. A system according to claim 1, in which said control wire divides at its first mentioned end into two branches, each of which is multipled on one different terminal of the same numerical element of each recorder.

6. A system according to claim 1, in which each recorder comprises a second numerical element and a terminal of said second numerical element is connected to the brush of the first numerical element instead of being connected to a control wire.

7. A system according to claim 2, said system further comprising: in each selector a second row of control terminals over which may hunt a second control wiper having constantly the same orientation as said first mentioned control wiper; a plurality of second-stage selectors each of which has a control wiper and a connecting relay and is multipled on one of said control terminals of said second row of control terminals of each of said first named selectors, said connecting relay having a rest contact for connecting said last mentioned control wiper with said last mentioned terminal and in each recorder means for connecting said second control wiper to said second mentioned pole after said test circuit has been closed and said second-stage selector has been found free.

8. A system according to claim 2, said system further comprising: a plurality of preliminary selectors each having a row of test terminals, a first row of control terminals and a second row of control terminals, over which may respectively hunt a test wiper, a first control wiper and a second control wiper having constantly the same orientation, each selector being multipled on a plurality of control terminals of said second row of control terminals of each preliminary selector; a derivation branching from a control wire and ending over a rectifying cell on the terminals of said first row of control terminals which have the same orientation as said terminals of said second row; in each register a mixer, means for connecting said second control wiper to said second mentioned pole after said test circuit passing over said test wiper of said preliminary selector has been closed and the selector has been found free, means for normally moving said mixer to its next position when a selector of any stage has been found free, and a pilot line connected to said terminals of said first row for preventing said mixer to move to its next position.

9. In an automatic switching system for a telecommunication exchange; a plurality of calling lines; a plurality of called lines; a recorder comprising a finder wiper capable of hunting over a row of terminals; a connection between this wiper and the free pole of the current supply battery of the system; a plurality of connection circuits for connecting any calling line to any called line and each of which comprises one of said terminals; a connection between the terminal of an idle link circuit and the ground; and means for moving said wiper until it passes over a grounded terminal.

10. An automatic system for telecommunication according to claim 9, in which; the recorder comprises a second wiper which is also connected to said free pole, has constantly the same orientation as said first wiper and is capable of moving over a second row of terminals; each terminal of said second row is connected to an extremity of the winding of the driving electro-magnet of one of the two switches being part of said connection circuit, and the other extremity of said winding is grounded.

11. An automatic system for telecommunication according to claim 10 in which; said recorder comprises a third wiper which is also connected to said free pole, has constantly the same orientation as said first two wipers, and is capable of moving over a third row of terminals; said switch comprises a test wiper capable of hunting over a row of test terminals, each terminal of a line to be connected is grounded and the recorder comprises means for stopping said test wiper when said test wiper passes over a line to be connected.

12. An automatic system for telecommunication according to claim 11 in which each connection circuit comprises means whose operation connects the calling line to the called line over said connection circuit and said connection circuit to said free pole, each recorder comprises means for operating said first mentioned means and for removing said connection of said finder wipers with said free pole.

13. In an automatic switching system for a telecommunication exchange: a plurality of control units each of which comprises a finder having a control wiper adapted to hunt over a row of control contacts and an individual battery having no point in common with the individual battery of any other control unit; a plurality of call finders each of which has a control wiper adapted to hunt over a corresponding row of contacts; means for connecting any control unit to any call finder and thereby one pole of said battery to said control wiper of said call finder; a plurality of marking wires each of which is multipled at one end to one of said control contacts of said call finders and at its other end to one of said contacts of said finder; a connection between said control wiper of said finder and the second pole of said individual battery; and means for stepping said finder until closure of an electrical circuit between said two poles.

14. In an automatic switching system for a telecommunication exchange: a plurality of recorders; a plurality of call finders each of which has a control wiper adapted to hunt over a corresponding row of contacts; a plurality of recorders for charged communications, each of which comprises a finder having a control wiper adapted to hunt over a row of control contacts; in each recorder an individual battery having no point in common with the individual battery of any other recorder; means for connecting any recorder to any call finder and thereby one pole of said battery to said control wiper of said call finder; means for connecting any recorder for charged communications to any recorder; a plurality of marking wires each of which is multipled at one end to one of said control contacts of said call finders and at its other end to one of said contacts of said finder; a connection over said means for connecting said recorder for charged communications with said recorder between said control wiper of said finder and the second pole of said individual battery; and means for stepping said finder until closure of an electrical circuit between said two poles.

HENRI LOUIS LESIGNE.

References Cited in the file of this patent

UNITED STATES PATENTS

| Number | Name | Date |
|---|---|---|
| 1,872,842 | Storch et al. | Aug. 23, 1932 |
| 2,211,927 | Griffins | Aug. 20, 1940 |